US012692126B2

(12) United States Patent
Galle

(10) Patent No.: US 12,692,126 B2
(45) Date of Patent: Jul. 28, 2026

(54) SYSTEMS AND METHODS FOR MONITORING ELEVATOR DUAL COIL ELECTROMECHANICAL BRAKES

(71) Applicant: TK Elevator Innovation and Operations GmbH, Duesseldorf (DE)

(72) Inventor: Leoci Rudi Galle, Porto Alegre (BR)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 855 days.

(21) Appl. No.: 18/101,819

(22) Filed: Jan. 26, 2023

(65) Prior Publication Data

US 2023/0249942 A1 Aug. 10, 2023

Related U.S. Application Data

(60) Provisional application No. 63/267,159, filed on Jan. 26, 2022.

(51) Int. Cl.
*B66B 5/02* (2006.01)
*B66B 1/06* (2006.01)
(Continued)

(52) U.S. Cl.
CPC .................. *B66B 5/02* (2013.01); *B66B 1/06* (2013.01); *B66B 1/3461* (2013.01); *B66B 1/36* (2013.01)

(58) Field of Classification Search
CPC ........... B66B 5/02; B66B 1/06; B66B 1/3461; B66B 1/36
See application file for complete search history.

(56) References Cited

U.S. PATENT DOCUMENTS 4,984,659 A * 1/1991 Nomura .................... B66B 1/32 187/296
5,247,140 A * 9/1993 Iwasa ........................ B66B 1/32 318/757
(Continued)

FOREIGN PATENT DOCUMENTS

DE 10149604 A1 * 4/2003 ................ H02P 3/04
DE 102019116221 A1 * 12/2020 ........... B66B 5/0037
(Continued)

OTHER PUBLICATIONS

Balakrishnam et al., "Detection of Plunger Movement in DC Solenoids", Texas Instruments, Jun. 2015, 10 pages.

*Primary Examiner* — Eduardo Colon Santana
(74) *Attorney, Agent, or Firm* — Dinsmore & Shohl LLP

(57) ABSTRACT

Embodiments of the present disclosure are directed to a system for monitoring conditions of elevator braking assemblies. The system includes a processing device configured to receive an actual braking current data from the elevator braking assembly, determine a derivative, plot a derivative curve, determine a region of interest of the derivative curve that corresponds to an expected movement of the at least one mobile plate of the elevator braking assembly, determine whether a pair of inflection points occurred during the region of interest where one of the inflection points is a minimum point and the other is a maximum point, the maximum having a greater amplitude than the minimum point and occurring after the minimum point, and when the pair of inflection points does not occur during the region of interest, output an alert to the elevator controller to instruct the elevator controller to inhibit movement of the elevator cab.

20 Claims, 24 Drawing Sheets

(51) Int. Cl.
*B66B 1/34* (2006.01)
*B66B 1/36* (2006.01)

(56) References Cited

U.S. PATENT DOCUMENTS

| | | | | | |
|---|---|---|---|---|---|
| 5,717,174 | A * | 2/1998 | Ramos | B66D 5/30 187/292 |
| 6,311,801 | B1 * | 11/2001 | Takagi | B66B 1/32 187/290 |
| 8,727,075 | B2 * | 5/2014 | Huppunen | B60T 17/221 187/391 |
| 10,029,883 | B2 * | 7/2018 | Stolt | B66B 1/304 |
| 10,317,453 | B2 | 6/2019 | Narayanasamy et al. | |
| 10,895,608 | B2 | 1/2021 | Narayanasamy et al. | |
| 2015/0329318 | A1 * | 11/2015 | Cambruzzi | B66B 1/32 188/164 |
| 2017/0101289 | A1 * | 4/2017 | Stolt | B66B 1/32 |
| 2022/0194740 | A1 * | 6/2022 | Li | B66B 5/0031 |
| 2022/0281713 | A1 * | 9/2022 | Li | H01F 7/126 |
| 2023/0382686 | A1 * | 11/2023 | Li | B66B 5/0031 |

FOREIGN PATENT DOCUMENTS

| | | | | |
|---|---|---|---|---|
| EP | 1462673 A1 * | 9/2004 | F16D 66/02 |
| WO | WO-2006033165 A1 * | 3/2006 | B66D 5/08 |
| WO | WO-2009024168 A1 * | 2/2009 | H02P 29/04 |

* cited by examiner

```
% wn^2 * s / (s^2 + 2 psi*wn*s * wn^2)

if bBrkDir == true
        fn = 5;  %Hz  % Brake pick/lift
else
        fn = 10;  %Hz  ¢ Brake drop
end

T  =  1.0/SampleRate;
qsi  =  0.7;
wn  =  2.0*3.1415*fn;
wnT2  =  wn*T*wn*T;
b  =  2.0*T*wn*wn;
a1  =  4.0 + (4.0*qsi*wn*T) + wnT2;
a2  =  (2.0*wnT2) -8.0;
a3  =  wnT2 - (4.0*qsi*wn*T) + 4.0;



    % - - - - - - - - - - - - Calculating derivative - - - - - - - - - - - - - - - - - - -

    if (bBrkDir == true) % Lift
      dsdt = 1.0/a1*(-a2*dsdt_1-a3*dsdt_2+b*(s_in-s_2));
    else % Drop
      dsdt = 1.0/a1*(-a2*dsdt_1-a3*dsdt_2+b*-(s_in-s_2));
    end
```

FIG. 24

SYSTEMS AND METHODS FOR MONITORING ELEVATOR DUAL COIL ELECTROMECHANICAL BRAKES

CROSS REFERENCE TO RELATED APPLICATIONS

This utility patent application claims priority benefit from U.S. Provisional Patent Application Ser. No. 63/267,159, filed on Jan. 26, 2022, entitled "Method for Dual Coil Electromechanical Brake Monitoring", the entire contents of which is incorporated herein in its entirety.

TECHNICAL FIELD

The present disclosure generally relates to elevator brake assemblies and, more particularly, to systems and methods for monitoring movements of mobile plates within elevator brake assemblies.

BACKGROUND

Elevator construction code requirement establishes that mechanical components of a brake system must be installed at least in two sets. Furthermore the code establishes that in case of using the brakes to protect against ascending cab over speed and protect against unintended cab movement, the brake system needs to be self-monitored, so that if one of the electromechanical devices does not work properly further movement of cab must be interrupted. Known conventional assemblies install one mechanical brake switch on each set of mechanical parts of brake system in order to check for correct lifting and/or dropping of each mechanical set. However, such solution of a double set of devices requires sensors, holders, ducts, wiring, adjusting, and regular maintenance, all of which add complexity and due to regular operation are subject to fatigue and need of replacing.

SUMMARY

In one embodiment, a system for monitoring operating conditions of an elevator braking assembly communicatively coupled to a traction sheave that moves an elevator cab between a plurality of positions, the elevator braking system having at least one mobile plate and a coil that when energized moves the at least one mobile plate from an engaged position to inhibit movement of the traction sheave to a disengaged position is provided. The system includes an elevator controller configured to control movement of the elevator cab, a processing device communicatively coupled to the elevator controller, and a non-transitory, processor-readable storage medium in communication with the processing device. The non-transitory, processor-readable storage medium comprising one or more programming instructions that, when executed, cause the processing device to receive an actual braking current data from the elevator braking assembly, determine a derivative of the actual braking current data, plot a derivative curve of the derivative of the actual braking current data; determine a region of interest of the derivative curve that corresponds to an expected movement of the at least one mobile plate of the elevator braking assembly, determine whether a pair of inflection points occurred during the region of interest where one of the inflection points is a minimum point and the other is a maximum point, the maximum point having a greater amplitude than the minimum point and occurring after the minimum point, and when the pair of inflection points does not occur during the region of interest of the derivative curve, output an alert to the elevator controller to instruct the elevator controller to inhibit movement of the elevator cab.

In another embodiment, a system for monitoring operating conditions of an elevator braking assembly of an elevator assembly, the elevator assembly further including an elevator controller, an elevator cab and at least one traction sheave having the braking assembly coupled thereto, the elevator braking system having at least one mobile plate and a coil that when energized moves the at least one mobile plate from an engaged position to inhibit movement of the at least one traction sheave to a disengaged position, an elevator hoisting member extending around the at least one traction sheave to support the elevator cab, and the elevator controller configured to control the at least one traction sheave to move the elevator hoisting member to move the elevator cab is provided. The system including a processing device communicatively coupled to the elevator controller and a storage medium in communication with the processing device. The storage medium having one or more programming instructions that, when executed, cause the processing device to receive an actual braking current data from the elevator braking assembly that is filtered and converted to digital signals, determine a derivative of the digital signals, plot a derivative curve of the determined derivative of the digital signals indicative of the actual braking current data, determine a region of interest of the derivative curve that corresponds to an expected movement of at least one mobile plate of the elevator braking assembly, determine whether a pair of inflection points occurred during the region of interest where one of the inflection points is a minimum point and the other is a maximum point, the maximum point having a greater amplitude than the minimum point and occurring after the minimum point, and when the pair of inflection points does not occur during the region of interest of the derivative curve, output an alert to the elevator controller to instruct the elevator controller to inhibit movement of the elevator cab.

In yet another embodiment, a method for monitoring operating conditions of an elevator braking assembly of an elevator assembly, the elevator assembly further including an elevator controller, an elevator cab and at least one traction sheave having the braking assembly coupled thereto, the elevator braking system having at least one mobile plate and a coil that when energized moves the at least one mobile plate from an engaged position to inhibit movement of the at least one traction sheave to a disengaged position, an elevator hoisting member extending around the at least one traction sheave to support the elevator cab, and the elevator controller configured to control the at least one traction sheave to move the elevator hoisting member to move the elevator cab is provided. The method including receiving an actual braking current data from the elevator braking assembly, determining a derivative of the actual braking current data, plotting a derivative curve of the derivative of the actual braking current data, determine a region of interest of the derivative curve that corresponds to an expected movement of the at least one mobile plate of the elevator braking assembly, determining whether a pair of inflection points occurred during the region of interest where one of the inflection points is a minimum point and the other is a maximum point, the maximum point having a greater amplitude than the minimum point and occurring after the minimum point, and when the pair of inflection points does not occur during the region of interest of the derivative curve, outputting an alert to the elevator controller to instruct the elevator controller to inhibit movement of the elevator cab.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 24 schematically depicts an example simulation algorithm to determine a derivative of the braking current of the example braking assembly from the example elevator assembly of FIG. 1A according to one or more embodiments shown and described herein.

DETAILED DESCRIPTION

Embodiments of the present disclosure are directed to improved systems and methods to monitor and identify when a moveable plate in an example braking assembly is not functioning or moving correctly by calculating either a derivative of a current of the solenoid or an integral of an integrated area and analyzing the derivative or integral to determine a current position of the mobile plate in view of the expected position. More specifically, the disclosed systems and methods provide an approach for improved signal determination by utilizing a derivative of the braking current and/or an integral of the derivative current of an electromechanically magnetic core within the example braking assembly that cause a moveable plate to move between a retracted and extended positon, similar to a plunger in solenoid and to monitor actual position of the moveable plates for undesirable positions based on a desired or expected position of the moveable plates. Embodiments herein monitor for such changes in the expected positioning of the moveable plates using various techniques including machine learning processes, artificial intelligence, algorithms, and the like, to automatically determine when a deviation occurs signaling a change in the condition of the elevator braking assembly that may require an immediate elevator cab stop.

As such, the various components described herein may be used to carry out one or more processes to improve accuracy of determining undesirable conditions of the elevator braking assemblies and to passively improve protecting against ascending cab over speed and protecting against unintended cab movement as required by elevator construction code requirements. Further, various components described herein may be used to alert a user when certain predetermined parameters are below predetermined threshold values or automatically initiating an elevator cab stop to prevent or inhibit further movement of the elevator cab.

Various systems and methods for coil electromechanical brake monitoring are described in detail herein.

Figure 1A:
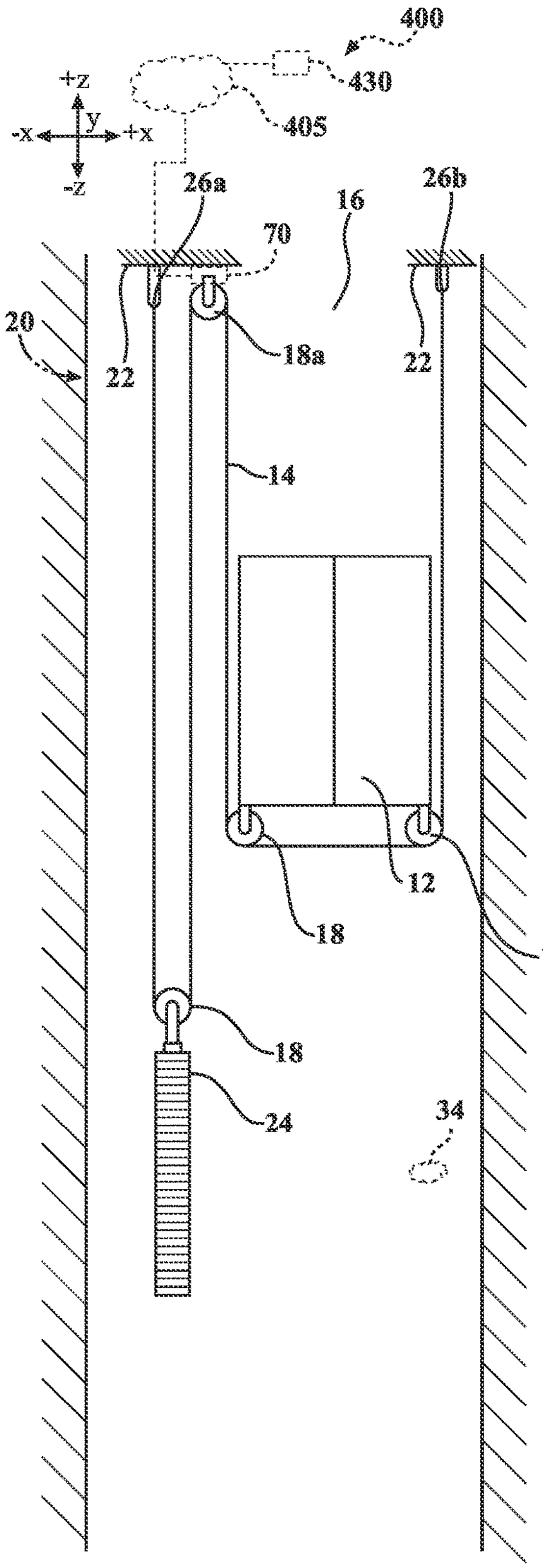
FIG. 1A schematically depicts a first aspect of an example elevator assembly schematic according to one or more embodiments shown and described herein.

As used herein, the term “longitudinal direction” refers to the forward-rearward direction of the elevator assembly (i.e., in a +/−Y direction of the coordinate axes depicted in FIG. 1A). The term “lateral direction” refers to the cross-direction (i.e., along the X axis of the coordinate axes depicted in FIG. 1A), and is transverse to the longitudinal direction. The term “vertical direction” refers to the upward-downward direction of the elevator stabilizing assembly (i.e., in the +/−Z direction of the coordinate axes depicted in FIG. 1A).

The phrase “communicatively coupled” is used herein to describe the interconnectivity of various components of the monitoring system for elevator assemblies and means that the components are connected either through wires, optical fibers, or wirelessly such that electrical, optical, data, and/or electromagnetic signals may be exchanged between the components. It should be understood that other means of connecting the various components of the system not specifically described herein are included without departing from the scope of the present disclosure.

Referring now to the drawings, FIG. 1A depicts an elevator assembly schematic that illustrates various components for a first aspect of an example elevator assembly 10. In this aspect, the example elevator assembly 10 may include an elevator cab 12, a plurality of elevator hoisting members 14 illustrated for schematic reasons as a single suspension member and herein referred to as hoisting members, a hoistway 16 or elevator shaft, a plurality of sheaves 18, an example frame 20, and a plurality of weights 24 that act as a counterweight to the elevator cab 12. The plurality of weights 24 move within the example frame 20 in the system vertical direction (i.e., in the +/−Z direction). The example frame 20 may be an elevator frame, a counterweight elevator frame, and/or the like, as discussed in greater detail herein. The plurality of elevator hoisting members 14 include a distal end 26*a* and a proximate end 26*b*.

Further, in this aspect, as illustrated and without limitation, the example frame 20 includes two sheaves of the plurality of sheaves 18. For example, one sheave is fixedly mounted to an upper portion of the example frame 20 positioned in an upper portion of the hoistway 16 above the elevator cab 12 in a vertical direction (i.e., in the +/−Z direction) and another sheave moves with the weights 24 as the elevator cab 12 moves between various landings. This is non-limiting, and any number of the plurality of sheaves 18 may be mounted anywhere within the hoistway 16 and there may be more than or less than the two sheaves illustrated as being in the example frame 20.

At least one of the plurality of sheaves 18 within the hoistway 16 may include a motor 52 (FIG. 2*b*) such that the sheave 18 is a traction sheave 18*a* capable of driving the plurality of elevator hoisting members 14 through a plurality of lengths between the elevator cab 12 and the traction sheave 18*a*. In embodiments, the traction sheave 18*a* further includes an example braking assembly 54 to prevent movement of the traction sheave 18*a*. In some embodiments, the brake may be an electromechanical device utilizing compression spring type brakes. In other embodiments, the brake may incorporate a friction member, such as a friction disc 62, which is used to develop a braking torque when compressed against, for example, a shaft of the traction sheave 18*a*. These are non-limiting examples and the type of brake will apparent to those skilled in the art to provide ascending car over speed protection, ascending car uncontrolled low speed protection, descending car uncontrolled low speed protection, unintended cab movement, and/or the like.

Further, the plurality of sheaves 18 may further include a plurality of idler sheaves that may also be mounted at various positions in the hoistway 16, and, in this aspect, are also coupled to the elevator cab 12. Idler sheaves are passive (they do not drive the elevator hoisting members 14, but rather guide or route the plurality of elevator hoisting members 14) and form a contact point, or engagement point, with the elevator cab 12. The plurality of elevator hoisting members 14 and the plurality of sheaves 18 move the elevator cab 12 between a plurality of positions within the hoistway 16 including to a plurality of landings. The plurality of sheaves 18 may include any combination of traction type sheaves and idler type sheaves.

As illustrated in FIG. 1A, the elevator assembly 10 is an underslung system, with the idler sheaves positioned on a bottom surface of the elevator cab 12. Each of the plurality of elevator hoisting members 14 may be movably coupled to the traction sheave 18*a* and a portion of the plurality of elevator hoisting members 14 may be coupled to the bottom surface of the elevator cab 12 to suspend the elevator cab 12 via the idler sheaves. As such, the elevator hoisting members 14 pass under the elevator cab 12 on a bottom of the elevator cab 12 via the idler sheaves, and are coupled at the top of the hoistway 16 under tension to various structures, such as to the example frame 20, rail caps 22, and/or the like. For example, the proximate end 26*b* of the plurality of elevator hoisting members 14 may be fixedly coupled to the rail caps 22 and the movably coupled portion of the plurality of elevator hoisting members 14 are under tension to move the elevator cab 12 between various landings. The example frame 20 may include a dead end hitch, at least one rail cap 22, or other structural components.

Figure 1B:
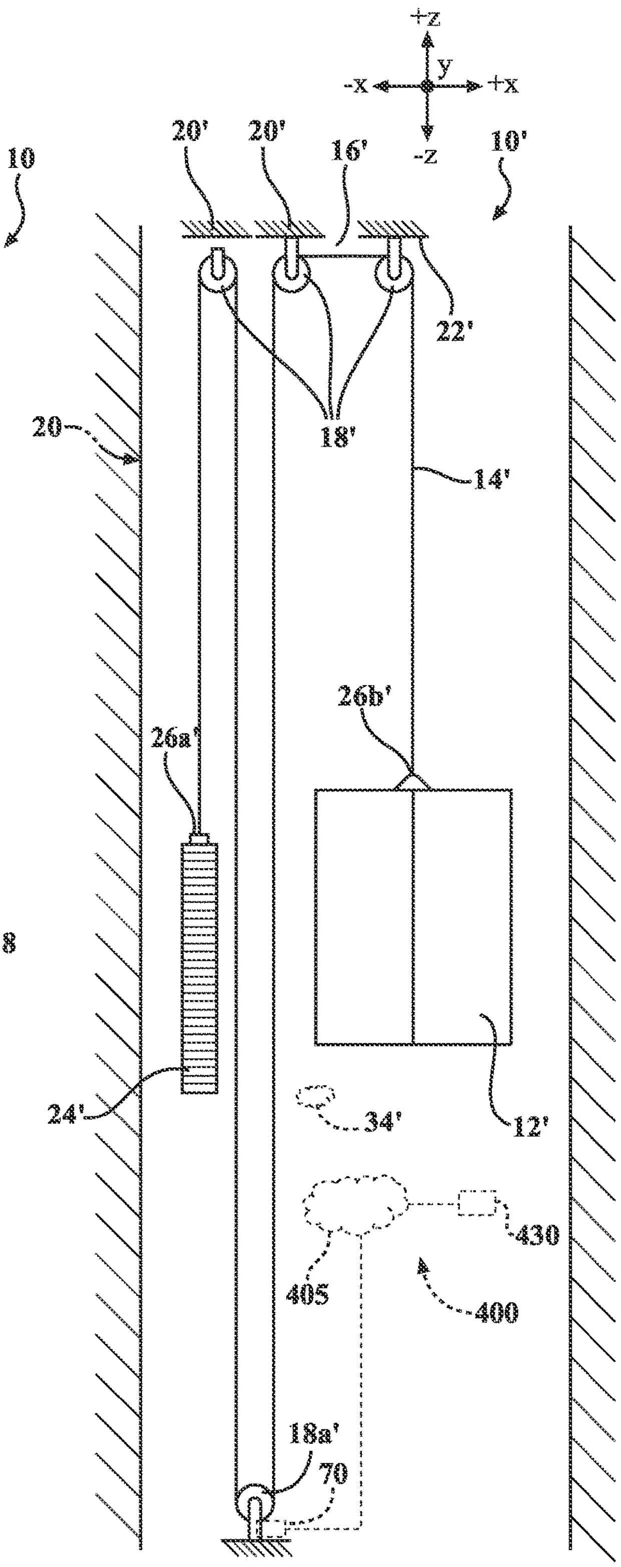
FIG. 1B schematically depicts a second aspect of an example elevator assembly schematic according to one or more embodiments shown and described herein.

Referring now to FIG. 1B, a schematic illustrating various components for a second aspect of an example elevator assembly 10' is depicted. It should be appreciated that in the discussion herein, the elevator assembly 10, and components thereof, may refer to either elevator assembly 10, 10'. In this aspect, the elevator assembly 10' may include an elevator cab 12', a plurality of elevator hoisting members 14' illustrated for schematic reasons as a single suspension member, a hoistway 16' or elevator shaft, a plurality of sheaves 18', such as traction sheaves and/or idler sheaves, an example grounded frame 20', and a plurality of weights 24' that move within the example frame 20' in the system vertical direction (i.e., in the +/−Z direction). In this aspect, the plurality of elevator hoisting members 14' extend a length between the weights 24' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor and a brake such that at least one of the plurality of sheaves 18' is a device to drive the plurality of elevator hoisting members 14' through a plurality of lengths with respect to the length between the traction sheave and the contact point of the elevator cab 12'. The idler sheaves may also be mounted at various positions in the hoistway 16' including within the example frame 20'. The idler sheaves are passive (they do not drive the plurality of elevator hoisting members 14' but rather guide or route the plurality of elevator hoisting members 14'). The plurality of elevator hoisting members 14' are coupled to the elevator cab 12' to form the contact point. At least one temperature sensor 34' may be positioned within the hoistway 16'. The at least one temperature sensor 34' may output data indicative to a temperature within the hoistway 16'.

It should be appreciated that the illustrated schematics of FIGS. 1A-1B are merely examples and that the plurality of elevator hoisting members 14 routing may vary significantly or slightly from these illustrated schematics. For example, there may be several idler sheaves positioned in the hoistway 16 between the traction sheave and the contact point with the elevator cab 12.

Figure 2A:
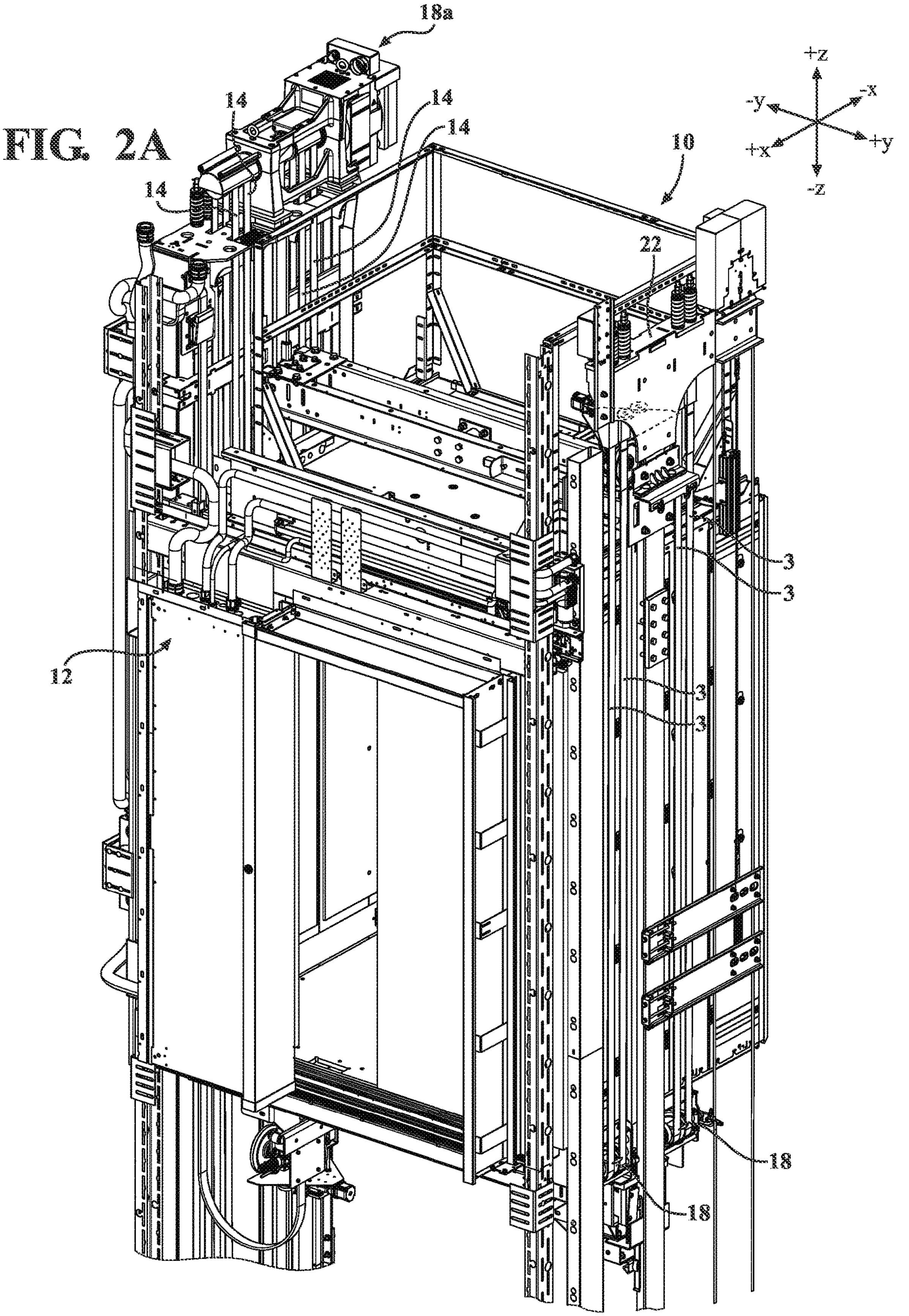
FIG. 2A schematically depicts a partial perspective view of the example elevator assembly of FIG. 1A according to one or more embodiments shown and described herein.
Figure 2B:
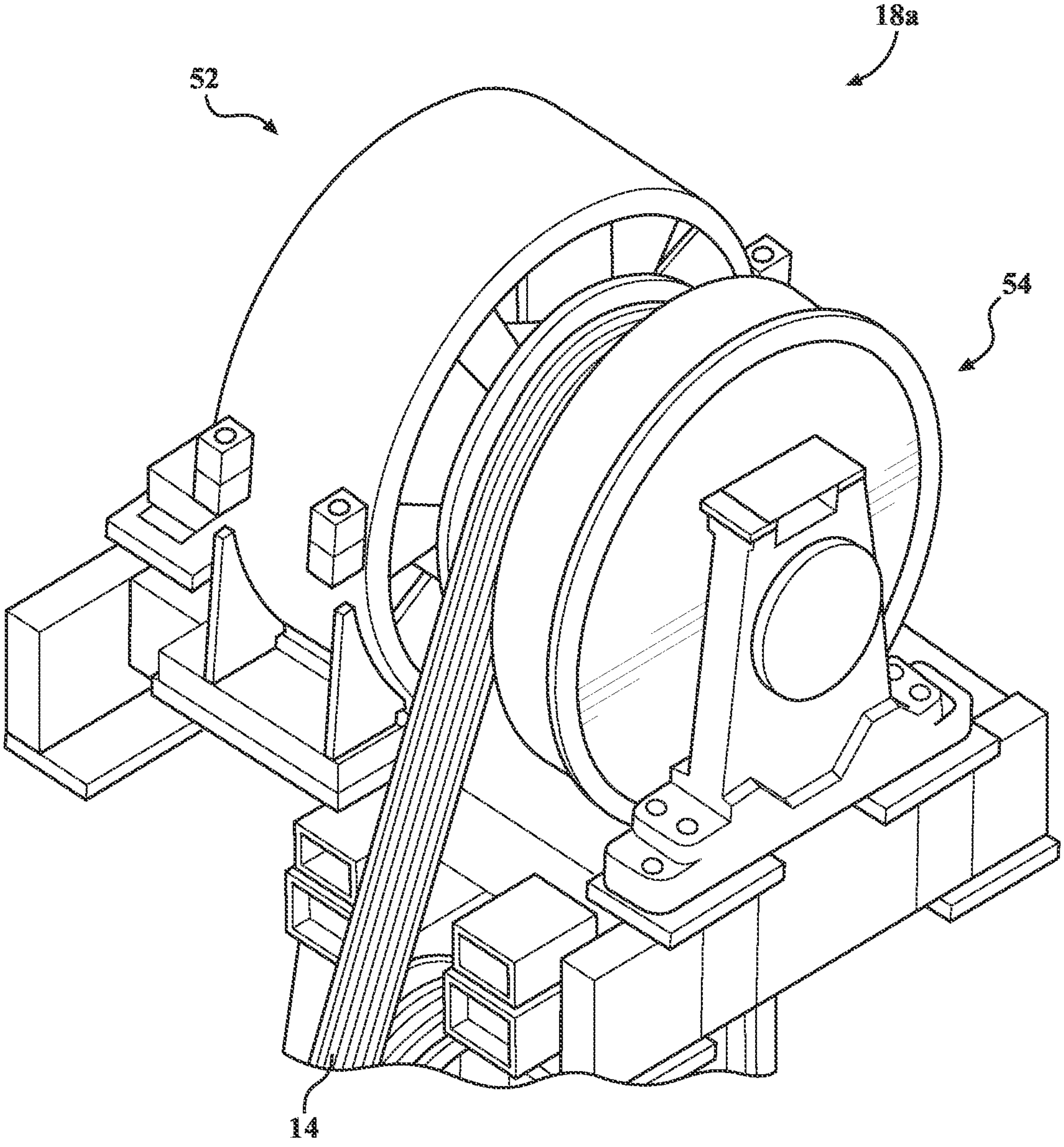
FIG. 2B schematically depicts an isolated perspective view of an example traction sheave and an example braking assembly from the example elevator assembly of FIG. 1A according to one or more embodiments shown and described herein.
Figure 3:
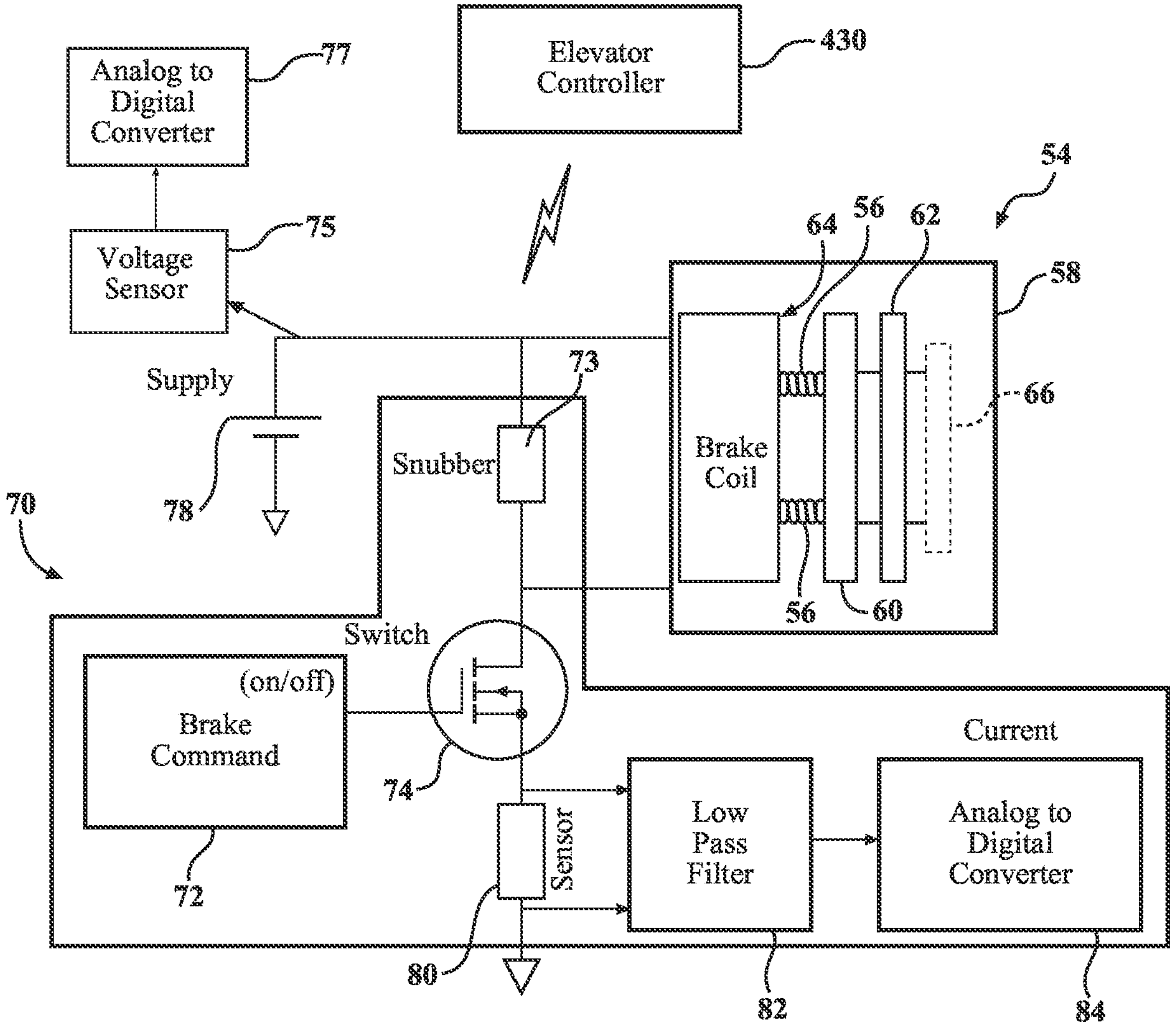
FIG. 3 schematically depicts an illustrative monitoring controller and the example braking assembly of FIGS. 2A-2B according to one or more embodiments shown and described herein.

Referring back to FIG. 1A and now to FIGS. 2A-2B and 3, the traction sheave 18*a* includes the example braking assembly 54, which may include a brake shoe 66 or, alternatively, a friction disc 62. The braking assembly 54, in an illustrated embodiment and to be understood as merely a non-limiting example, may be a compressions spring type brake. As such, in the absence of an electric current, springs 56, positioned within a casing or housing 58, exercise a force onto mobile plates 60 that stops movement of the friction disc 62. When an electromagnet is excited, a magnetic field is generated in a magnetic core with coils 64 or ferromagnetic disc, which attracts the mobile plates 60, which displaces the mobile plates 60 releasing the friction disc 62. As such, the attraction of the mobile plates 60 to the magnetic core with coils 64 is greater than the biasing force of the springs 56. Displacement or movement of the mobile plates 60 may be monitored similar to a plunger in solenoid, such as linear solenoids.

As such, example elevator brakes may function similar to linear solenoids, which are electromechanical devices that convert electrical energy into a linear mechanical motion which is used to control a system such as a braking system. The solenoid may include an electromagnetically inductive coil wound around a movable armature, or plunger. The coil is shaped such that the armature can be moved in and out of its center, altering the inductance of the coil. The solenoid is operated by applying an excitation voltage to the electrical terminals of the solenoid. This voltage builds up current in the solenoid winding and the current produces a magnetic flux that closes through the housing of the solenoid, plunger and air gaps, which form a magnetic circuit. The magnetic field, through the main air gap, exerts an attractive force on the plunger intent to pull it inside the housing. As such, typical solenoids comprise an electromagnetic system and a mechanical system. The electromagnetic system converts applied voltage to magnetizing current which in turn produces an electromagnetic force while the mechanical system includes the plunger and return spring producing the linear movement due to the electromagnetic force. This is similar to the example braking assembly 54 depicted in FIG. 3.

Additionally, the example braking assembly 54 depicted in FIG. 3 may be a dual coil system with one mobile plate per magnetic core with coils 64 for each of the dual coils. As such, dual coil systems have two separated brake sets, each one with its own mobile plate, springs and magnetic core with coils. The brakes are independently operated by energizing the magnetic core with coils with an excitation voltage. For brevity reasons, only a single coil system is illustrated in FIG. 3.

Figure 6:
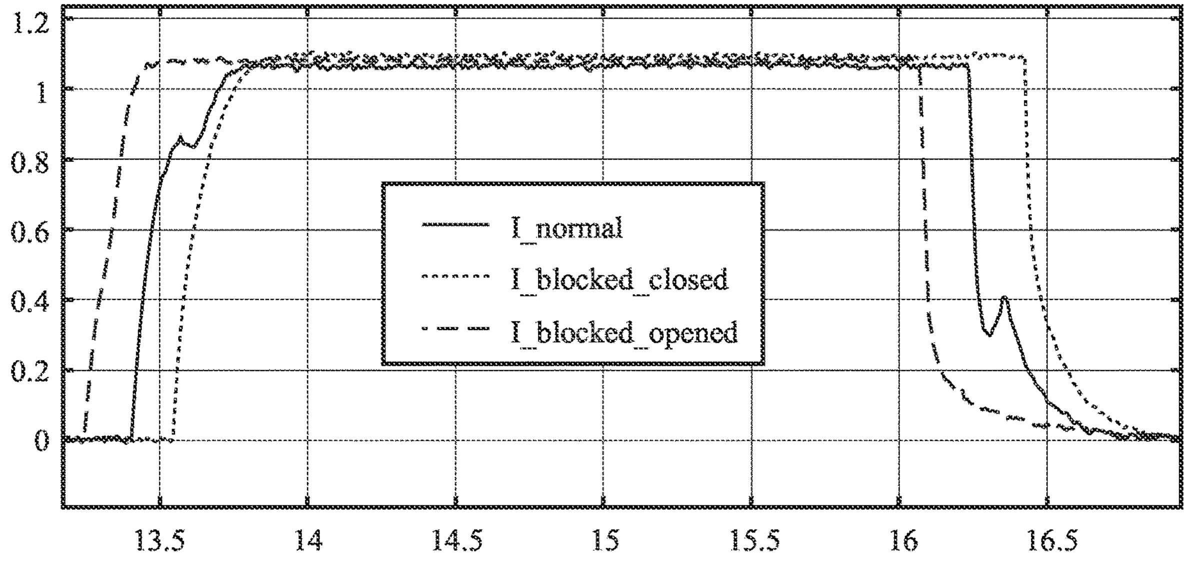
FIG. 6 schematically depicts a graphical representation of three current curves based on movement behaviors of the moveable plates of the example braking assembly that occur during a brake cycling process according to one or more embodiments shown and described herein.

Still referring to FIGS. 2A-2B and 3, and also now referring to FIG. 6, the example braking assembly 54 acts slightly different when compared with solenoids such as a lower back EMF (Electromotive Force). The movement of each of the mobile plates 60 induces back EMF in the magnetic core with coils 64 and this causes a little change in the exponential current curve, not necessarily presenting a peak and valley when monitoring a braking current, as is generally monitored in conventional systems. As such, in a normally operating braking assembly, the acquired braking current will not necessary present a depression while the mobile plates 60 are moving, sometimes only the current increasing rate decreases (the gradient changes) a very small amount. As such, similar behavior, depicted by a solid line in FIG. 6, illustrates when the example braking assembly 54 is supplied with a constant voltage source and the mobile plates 60 moves properly from dropped position to lifted position and from the lifted position to the dropped position. The depicted dotted line in FIG. 6 illustrates a condition when the mobile plates 60 of the example braking assembly 54 is in the dropped position (engaged against the friction disc 62 to engage the brake) and does not change positions or states as expected. The depicted dashed line in FIG. 6 illustrates a condition when the mobile plates 60 are in the lifted position (retracted from the friction disc 62 such that the brake is disengaged) and does not change positions or states as expected.

As the excitation current gradient is directly correlated with the circuit inductance and the inductance itself depends on the position of the mobile plates 60, the inductance is smaller in the dropped position (brake engaged) and higher at the final, lifted position (brake disengaged), and illustrates why the illustrated lines in FIG. 6 are not symmetrical or inverse of one another when there is no movement.

As such, a slope of the excitation current, such as illustrated in FIG. 6, is directly correlated with the circuit inductance and the brake inductance depends on the position of the mobile plates 60. As such, in the first milliseconds of the energization process, brake sets initial state can be detected. For example, in starting the elevator, if a slope is smaller than a threshold (smaller inductance) then the example braking assembly 54 starting from the dropped position, which is satisfactory. If the slope above a threshold (higher inductance) then the example braking assembly 54 is already in the lifted position, which would generate a fault, as discussed in greater detail herein. As such, the inductance variation, observed by rate of braking current change, may be used in parallel to methods 1000, 1200 (FIGS. 10 and 12) to discover very early an error in the example braking assembly 54, as discussed in greater detail herein. As such, the braking current changes over time may be able to determine changes in the inductance of the magnetic core with coils 64 to determine undesirable conditions of the example braking assembly 54.

Examples of conditions or issues that may cause the mobile plates 60 to not move between states are manufacturing characteristics such as springs, iron, coils, friction and the like, brake snubber selection, an increase in air gap from wear, changes in the amount of applied current form the voltage source, temperature changes in the hoistway 16 that changes the braking current of the magnetic core with coils 64 and subsequently the amount of current, and temperature changes directly affecting the mechanical system.

It should be understood that the embodiments described herein applies a resource to amplify the effect of the movement of the mobile plates 60 over the entire circuit allowing to easily analyze the parameters as discussed in greater detail herein. For example, with reference to FIG. 3, the driver within the monitoring controller 70 may include a brake command 72, a switch 74, a snubber 73, a fixed DC voltage supply 78, a sensor 80, a low pass filter 82, an A-D converter 84, a voltage sensor 75, and an A-D converter 77. The sensor 80 may be a resistor or other component configured to receive and transmit the current from the example braking assembly 54. In operation, initially the brake command 72 of driver initiates the switch 74 into a closed state such that the switch connects the snubber 73 and the magnetic core with coils 64 to the fixed DC voltage supply 78. The braking current is detected using the sensor 80, which is then smoothed through the low pass filter 82 and the signal or data is converted from an analog to a digital signal via the A-D converter 84 indicative of the braking current of the example braking assembly 54. Further, a voltage may be acquired via the voltage sensor 75, which is then converted from an analog to a digital signal via the A-D converter 77.

In some embodiments, the derivative of the received braking current of the digital signal is calculated, for the brake dropped phase (brake engaged) and/or the lifted phase (brake disengaged). The derivative is then analyzed to determine the actual current positon of the mobile plates 60 to determine whether the mobile plates 60 is in the expected position. In other embodiments, an integral is used to determine an area under the derivative curve determined from the braking current, for the brake dropped phase (brake engaged) and/or the lifted phase (brake disengaged), as discussed in greater detail herein. The integrated area is then analyzed to determine the actual current positon of the mobile plates 60 to determine whether the mobile plates 60 is in the expected position, as discussed in greater detail herein.

As such, the monitoring controller 70 for use with the example braking assembly 54 may be configured to permit the transmitting and receiving of electrical signals for electrical monitoring by the monitoring controller 70 of the moveable plate of the example braking assembly 54. The monitoring controller 70 may be communicatively coupled to the example braking assembly 54 and to an elevator controller 430. In some embodiments, the monitoring controller 70 may be the elevator controller 430 and not a separate controller.

The monitoring controller 70 may be an electronic control unit or a central processing unit. As such, the monitoring controller 70 includes the necessary components to be communicatively coupled to the monitoring system 400 (FIG. 4), as discussed in greater detail herein. That is, the monitoring controller 70 may have data storage, software modules, and a processor, such as those commonly found in a central processing unit, and may have multiple inputs for various signal cables to be communicatively coupled to the example braking assembly 54, as discussed in greater detail herein with respect to FIGS. 5A-5C.

In operation, the monitoring controller 70 of the monitoring system 400 (FIG. 4) may receive continuous electrical monitoring signals (i.e., a braking current level signal and/or an inductance signal) from movement of the mobile plates 60 of the example braking assembly 54. At discrete intervals, the signal is analyzed by the monitoring controller 70 and/or the elevator controller 430 of the monitoring system 400 by calculating a derivate and/or an integral of the current signal and/or inductance signal to determine whether there are any inflection points, which are used to determine a minimum point and a maximum point with a difference between them and then determine whether the difference is within a predetermined threshold value and independently, whether time duration between the occurrence of the minimum point and the maximum point does not meet a predetermined time threshold. As such, a determination is made as to whether each of the mobile plates 60 are in the expected position of a brake normal, lifted and/or drop cycles of the example braking assembly 54, as discussed in greater detail herein. It should be appreciated that the predetermined threshold values may be influenced or affected by a brake rated current, derivative calculation parameters (damping factor and undamped natural frequency) adopted, and the like.

Figure 4:
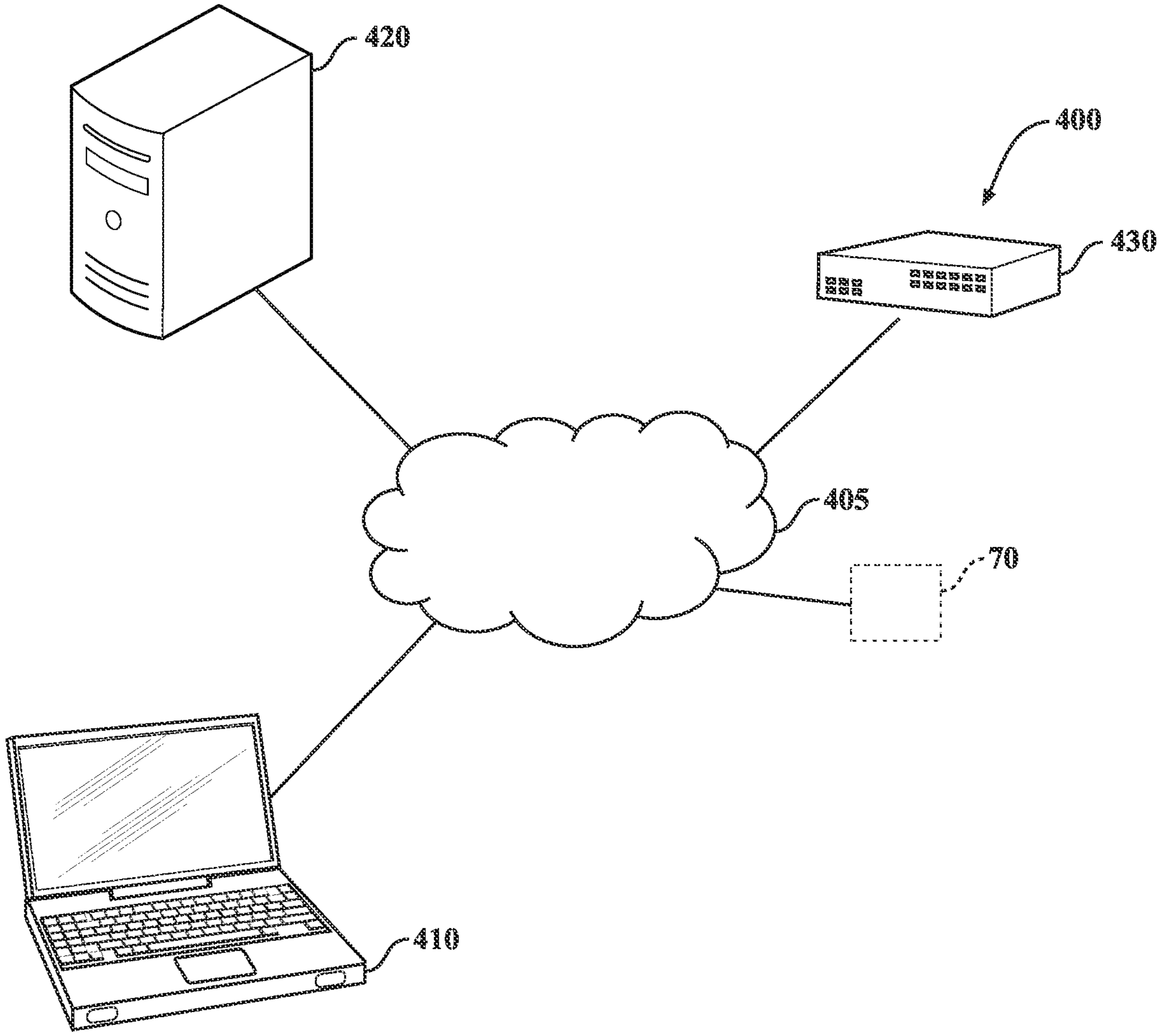
FIG. 4 schematically depicts an illustrative monitoring system having components for monitoring a movement of moveable plates of the example braking assembly of the elevator braking assembly of FIGS. 2A-2B and 3 according to one or more embodiments described and illustrated herein.

Referring now to FIG. 4, components of the illustrative monitoring system 400 configured to monitor the movement and/or position of the mobile plates 60 of the example braking assembly 54 is schematically depicted, according to embodiments shown and described herein. The monitoring system 400 may generally be configured to communicatively couple one or more computing devices and/or components thereof to the example braking assembly 54 within the elevator assembly 10 (FIGS. 1A-1B). As illustrated in FIG. 4, illustrative computing devices may include, but are not limited to, an electronic computing device 410, a server computing device 420, the elevator controller 430, and the monitoring controller 70. Further, it should be appreciated that these devices may be local to the elevator assembly 10 (FIG. 1A), may be remote from the elevator assembly 10 (FIG. 1A), and/or combinations thereof.

The computer network 405 may include a wide area network (WAN), such as the internet, a local area network (LAN), a mobile communications network, a public service telephone network (PSTN) a personal area network (PAN), a metropolitan area network (MAN), a virtual private network (VPN), and/or another network. Some components of the computer network 405 may be wired to one another using Ethernet (e.g., the monitoring controller 70, and/or the elevator controller 430) or hard wired to one another using conventional techniques known to those skilled in the art.

The components and functionality of the monitoring controller 70 will be set forth in detail below. It should be understood that the monitoring controller 70 may be part of the elevator controller 430 or the elevator controller 430 may replace the monitoring controller 70. The elevator controller 430 may be configured to control movement of the elevator cab 12 via the traction sheave 18*a*, movement of the example braking assembly 54, and the like, as discussed in greater detail herein.

Referring now to FIGS. 1A, 3 and 4, the electronic computing device 410 may generally provide an interface between a user and the other components connected to the monitoring system 400. In some embodiments, the electronic computing device 410 may be a user-facing device, such as any personal electronic device. For example, a laptop, mobile phone, tablet, desktop computer, and/or the like, that is positioned remote to the elevator controller 430 and/or the monitoring controller 70. In other embodiments, the electronic computing device 410 may be a human machine interface (HMI) or other electronic computing device positioned at and/or commutatively coupled to the elevator controller 430. The electronic computing device 410 may be used to perform one or more user-facing functions, such as receiving one or more inputs or data from the monitoring system 400. The electronic computing device 410 may present a user with a user interface that displays data, permits the user to interact with the data, set predetermined threshold values and adjust as necessary, and/or the like, as discussed in greater detail herein.

In some embodiments, the electronic computing device 410 may be configured to provide desired oversight, updating, and/or correction to the monitoring controller 70, the elevator controller 430 and/or the server computing device 420. The electronic computing device 410 may also be used to connect additional electronic computing devices 410, elevator controllers 430, server computing devices 420, and/or the like, to the network 405.

The monitoring controller 70 may receive data from one or more sources (e.g., from the example braking assembly 54, the elevator controller 430, the electronic computing device 410, and/or the like), generate data, store data, index data, search data, and/or provide data to the electronic computing device 410, the server computing device 420, and/or the elevator controller 430 (or components thereof). In some embodiments, the monitoring controller 70 may employ one or more algorithms that are used for the purposes of determining a position and/or movement of each of the mobile plates 60 and/or any undesirable conditions of each mobile plates 60 of the respective example braking assembly 54.

For example, a current signal that is transmitted and/or generated by a power supply to move the mobile plates 60 of the example braking assembly 54 is received by the monitoring controller 70 after being filtered and converted to a digital signal. The digital signal is converted into a derivative or an integral of the derivative and is plotted to determine a pair of inflection points where a minimum point occurs first and is less than a maximum point. An absolute difference value (amplitude change) between both the inflection points is determined and compared to an expected position of the mobile plates 60 and at an expected speed over a time period while moving the mobile plates 60 from an initial to a final position. As such, the plotted graph of either the derivative of the braking current or an area under the derivative curve using an integral of the derivative is calculated. Then the derivative or the integrated area is analyzed to determine a current position of the mobile plates 60, as discussed in greater detail herein. As such, it may be determined whether the mobile plates 60 are moving between positions properly and therefore the friction disc 62 of the example braking assembly 54 is engaged and/or disengaged as expected.

Moreover, the monitoring controller 70 may be used to produce data, such as establishing threshold values for the various positions of the mobile plates 60 of the example braking assembly 54, as described in greater detail herein. It should be appreciated that, in some embodiments, the elevator controller 430 may function as the monitoring controller 70 such that the elevator controller 430 performs some or all of the functionality of the monitoring controller 70, as discussed in greater detail herein. It should be appreciated that, in other embodiments, the electronic computing device 410 may function as the monitoring controller 70 such that the electronic computing device 410 performs some or all of the functionality of the monitoring controller 70, as discussed in greater detail herein. The components and functionality of the monitoring controller 70 will be set forth in detail below in FIGS. 5A-5C.

The server computing device 420 may be positioned onsite or remote to the elevator assembly 10 (FIGS. 1A-1B). The server computing device 420 may receive data from one or more sources (e.g., from the monitoring controller 70, the elevator controller 430, and/or the like), and may generate data, store data, index data, search data, and/or provide data to various components such as the electronic computing device 410, the elevator controller 430, and/or the like. In some embodiments, the server computing device 420 may store data from the monitoring controller 70 to reduce the amount of data storage held onto the monitoring controller 70. Further, the server computing device 420 may store data received from the elevator controller 430 such as data related to the elevator controller 430 inhibiting movement of the elevator cab 12 based on the determination of whether the mobile plates 60 moved as expected from the derivative curve or an nitrated area under the derivative curve, as discussed in greater detail herein.

Still referring to FIGS. 1A, 3 and 4, the elevator controller 430 provides commands to the traction sheaves 18, actuators of the elevator cab 12 to open or close the doors, and/or the like. Further, the elevator controller 430 may communicate movements, or lack of movements, of the elevator cab 12 to the monitoring controller 70 such that the monitoring controller 70 may collect electrical signal samples at various predetermined movements of the elevator cab 12 or at predetermined intervals of idle time of the elevator cab 12. As such, the elevator controller 430 may receive data from various sensors, from the monitoring controller 70, and/or the like, and control the elevator assembly 10 through sequences of operation and real-time calculations or algorithms. As such, the elevator controller 430 may contain the requisite processing device, hardware, software, and/or the like, to perform the functionalities relating to moving elevator cabs, hoisting members, traction sheaves, doors, and the like between and stopping at landings, and/or the like, generally associated with the elevator assembly 10.

It should be understood that the illustrative monitoring system 400 and components thereof (e.g., the monitoring controller 70, the electronic computing device 410, the server computing device 420, the elevator controller 430, and/or the like) may gather and transform data for better estimating an actual, real time condition of the example braking assembly 54 rather than using merely conventional techniques such as sensors, holders, ducts, wiring, adjusting, and regular maintenance requiring a technician to be present. As such, the components of the monitoring system 400 transform raw data received from the example braking assembly 54 and using various logic modules, machine learning techniques, and/or the like, determines whether the mobile plates 60 of the example braking assembly 54 are in the correct position and/or moving into the expected position within a predetermined amount of time, as discussed in greater detail herein. Such techniques improve accuracy of determining undesirable conditions of the example braking assembly 54 that affect the elevator assembly 10 and passively inhibit movement of the elevator cab 12 when certain predetermined parameters are below threshold values indicating at least one of the mobile plates 60 of the example braking assembly 54 is stuck in an open or closed position, as discussed in greater detail herein.

It should be understood that while the electronic computing device 410 is depicted as a personal computer, the server computing device 420 is depicted as a server, and the elevator controller 430 is depicted as a generic controller, these are merely examples. More specifically, in some embodiments, any type of computing device (e.g., mobile computing device, personal computer, server, and the like) may be utilized for any of these components. Additionally, while each of these computing devices is illustrated in FIG. 4 as a single piece of hardware, this is also an example. More specifically, each of the electronic computing device 410, the server computing device 420, and the elevator controller 430 may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 5A:
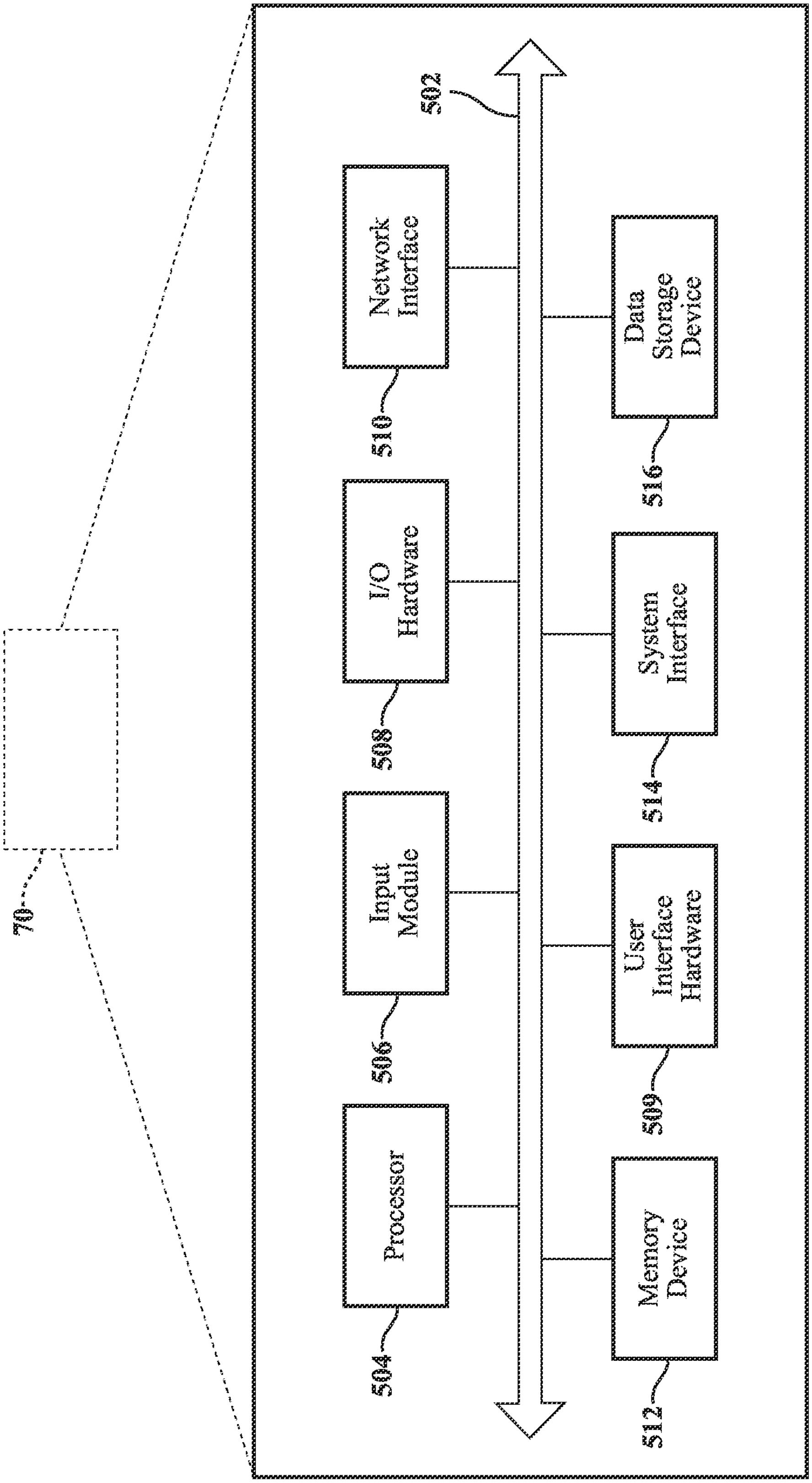
FIG. 5A schematically depicts illustrative hardware and software components of the monitoring controller that may be used for monitoring the movement of the moveable plates of the example braking assembly according to one or more embodiments described and illustrated herein.

Now referring to FIGS. 1A-3 and 5A, where FIG. 5A depicts the monitoring controller 70, further illustrating a system that identifies a condition or position of the mobile plates 60 of the example braking assembly 54 within the elevator assembly 10 by utilizing hardware, software, and/or firmware, according to embodiments shown and described herein. The monitoring controller 70 may include a non-transitory, computer readable medium configured for receiving raw data from various sources (e.g., the example braking assembly 54, the elevator controller 430, and/or the like), performing the various functions described herein such as those discussed with respect to FIGS. 10 and 12, providing commands to automatically stop a movement of the elevator cab 12, alerting a user, and/or the like, embodied as hardware, software, and/or firmware, according to embodiments shown and described herein.

While in some embodiments, the monitoring controller 70 may be configured as a general purpose computer with the requisite hardware, software, and/or firmware, in other embodiments, the monitoring controller 70 may be configured as a special purpose computer designed specifically for performing the functionality described herein. For example, the monitoring controller 70 may be a specialized device that particularly receives raw data, analyzes and transforms the raw data into new data, and applies algorithms, to the new data (e.g. digital data) to generate and plot a derivative and/or an integral of an integrated area for determining an actual, real time, operating position of the moveable plate within the example braking assembly 54 within the elevator assembly 10.

The monitoring controller 70 then analyzes the plot to determine an amplitude or difference value between two points determined during the plotting over a predetermined time threshold value or period to output commands or instructions of whether the example braking assembly 54 is functioning as expected to an external component (e.g., the electronic computing device 410 (FIG. 4)) and/or the elevator controller 430 for the purposes of improving the accuracy of passively monitoring the example braking assembly 54 within the elevator assembly 10. In some embodiments, the monitoring controller 70 determines undesirable conditions, such as a current, real time indication of the mobile plates 60 of the example braking assembly 54 stuck in an open (lifted) position, stuck in a closed (dropped) position, or reacting or moving slower than allowed in the predetermined time threshold or period, and/or the like, and provides results and/or generates data based on the undesirable conditions.

In some embodiments, the generated data may be in the form of a stop car command to the elevator controller 430 (FIG. 4) which in turn the elevator controller 430 (FIG. 4) inhibits the elevator cab 12 from movement, as discussed in greater detail herein. In other embodiments, the monitoring controller 70 provides data to the user presently located at the elevator assembly 10 via the electronic computing device 410, such as an HMI, or via a display device of the monitoring controller 70. In other embodiments, the monitoring controller 70 generates and sends data to the electronic computing device 410 (FIG. 4) positioned remotely from the elevator assembly 10 as, data, an alert and/or as a notification when the undesirable condition is determined such as by highlighting the undesirable condition, sending a notification of the undesirable condition, ranking the various undesirable conditions for the various example braking assemblies, and/or are otherwise indicated within the displayed results.

As illustrated in FIG. 5A, in some embodiments, the monitoring controller 70 may include a processor 504, input module 506, an input module 506, I/O hardware 508, user interface hardware 509, network interface hardware 510, a system interface 514, a data storage device 516, which stores a database of display data 550, an alert data 552, a transfer function data 554, a derivative data 556, an integral data 558, a current braking data 560, and a mobile plate movement data 562, and a memory device 512. The memory device 512 may be non-transitory computer readable memory. The memory device 512 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory device 512 may be configured to store operating logic 530, display logic 532, alert logic 534, comparison logic 536, derivative logic 538, integral logic 539, and current operating value logic 540 (each of which may be embodied as a computer program, firmware, or hardware, as an example). A local interface 502 is also included in FIG. 5A and may be implemented as a bus or other interface to facilitate communication among the components of the monitoring controller 70.

The processor 504, such as a computer processing unit (CPU), may be the central processing unit of the monitoring controller 70, performing calculations and logic operations to execute a program. The processor 504, alone or in conjunction with the other components, is an illustrative processing device, computing device, electronic control unit, or combination thereof. The processor 504 may include any processing component configured to receive and execute instructions (such as from the data storage device 516 and/or the memory device 512).

Still referring to FIG. 5A, the input module 506 may include tactile input hardware (i.e. a joystick, a keyboard, a mouse, a knob, a lever, a button, and/or the like) that allows the user to directly input settings. The I/O hardware 508 may communicate information between the local interface 502 and one or more other components of the monitoring system 400 (FIG. 4). For example, the I/O hardware 508 may act as an interface between the monitoring controller 70 and other components, such as the electronic computing device 410, and/or the like. In some embodiments, the I/O hardware 508 may be utilized to transmit one or more commands to the other components of the monitoring system 400 (FIG. 4).

Still referring to FIG. 5A, the user interface hardware 509 may permit information from the local interface 502 to be provided to the user, whether the user is local to the monitoring controller 70 or remote from the monitoring controller 70 (e.g., a user of the electronic computing device 410 (FIG. 4)). Still referring to FIG. 5A, the user interface hardware 509 may incorporate a display and/or one or more input devices such that information is displayed on the display in audio, visual, graphic, or alphanumeric format and/or receive inputs. Illustrative input devices include, but are not limited to, the devices discussed with respect to the input module 506, a keyboard, a touch screen, a remote control, a pointing device, a video input device, an audio input device, a haptic feedback device, and/or the like.

The network interface hardware 510 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 510 may provide a communications link between the monitoring controller 70 and the other components of the monitoring system 400 depicted in FIG. 4, including, but not limited to, the server computing devices 420, the electronic computing device 410, the elevator controller 430, and/or the like, as depicted in FIG. 4.

The system interface 514 may generally provide the monitoring controller 70 with an ability to interface with one or more external devices such as, for example, the electronic computing device 410, the elevator controller 430, and/or the like depicted in FIG. 4. Communication with external devices may occur using various communication ports (not shown). An illustrative communication port may be attached to a communications network.

Figure 5B:
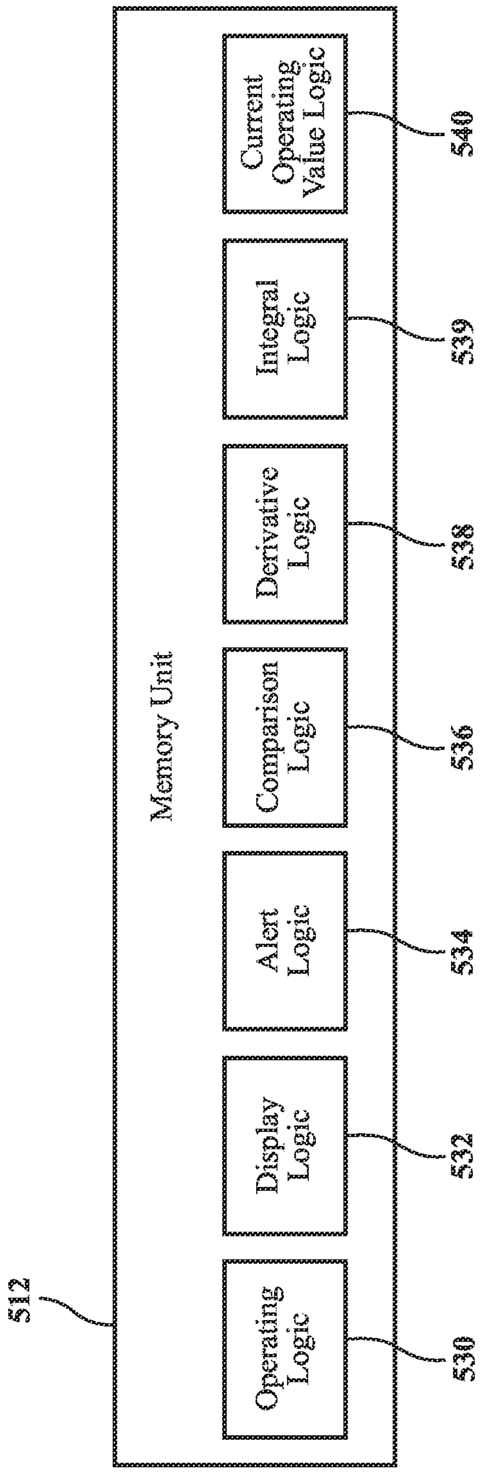
FIG. 5B schematically depicts an illustrative memory component containing illustrative logic components according to one or more embodiments shown and described herein.

With reference to FIG. 5B and back to FIGS. 2A-3, in some embodiments, the program instructions contained on the memory device 512 may be embodied as a plurality of software modules, where each module provides programming instructions for completing one or more tasks. For example, FIG. 5B schematically depicts the memory device 512 containing illustrative logic components according to one or more embodiments shown and described herein. As shown in FIG. 5B, the memory device 512 may be configured to store various processing logic, such as, for example, operating logic 530, display logic 532, alert logic 534, comparison logic 536, derivative logic 538, integral logic 539, and current operating value logic 540 (each of which may be embodied as a computer program, firmware, or hardware, as an example). The operating logic 530 may include an operating system and/or other software for managing components of the monitoring controller 70. Further, the operating logic 530 may contain one or more software modules for transmitting data, and/or analyzing data.

Still referring to FIG. 5B and to FIGS. 2A-3, the display logic 532 may contain one or more software modules for converting data into a display, such as on-demand graphical representations of the current curve of the example braking assembly 54 during various braking cycles (e.g., engaged and disengaged), displaying currently actual, or real time current curve of the braking assembly 54 during various braking cycles (e.g., engaged and disengaged), plotted derivative curves (e.g., FIGS. 7-9) of the braking current of the braking assembly 54 during various braking cycles (e.g., engaged and disengaged), calculating an integrated area below the derivative curve (e.g., FIG. 11) during various braking cycles (e.g., engaged and disengaged), and/or display of notifications and/or alerts to the user, as will be discussed in greater detail herein.

The alert logic 534 may contain one or more software modules for generating an elevator stop car command and an alert to notify a technician, for example, when the amplitude of the minimum and maximum points in a region area of interest in a derivative curve is less than a predetermined value, the minimum and maximum points extend in time beyond a predetermined time threshold value, there is not an identified minimum and maximum point in the identified region of interest in a derivative curve and/or or an integral of the integrated area of the derivative curve is less than an area predetermined thresholds. As such, the monitoring system 400 (FIG. 4) is configured to alert or notify the technician when these certain predetermined thresholds are not met and/or may send an alert to the elevator controller 430 to inhibit movement of the elevator cab 12 (FIG. 1A). As such, the alert may be an audio alert, such as an audible sound, a text alert, such as a push notification warning on a screen of the electronic computing device 410 (FIG. 4), a command to the elevator controller 430 (FIG. 4), a combination thereof, and/or the like. The alert may be preselected from a plurality of alert types.

The comparison logic 536 may contain one or more software modules for comparing a plotted derivative curve and/or the integrated area identified below or above the plotted derivative curve to known threshold values for a normal behavior of movement of the mobile plates 60 of the example braking assembly 54. The comparison logic 536 may include and/or use a lookup table and/or the like that establishes a correlation or comparison between a baseline of the normal behavior of movement of the mobile plates 60 of the example braking assembly 54 (e.g., a data value gathered and stored when the example braking assembly 54 was newly installed or otherwise in a desirable condition) and the current data (e.g., a raw data indicative of the real-time current of the example braking assembly 54). The comparison logic 536 may perform calculations to use as inputs into algorithms such as machine learning, simulation processes, and/or the like. For example, the comparison logic 536 may adjust the braking current data to account for wear or different types of example braking assemblies when compared to the baseline measured values (e.g., when the example braking assembly 54 was known to be in a desired or acceptable condition).

Still referring to FIG. 5B and still to FIGS. 2A-3, the derivative logic 538 may contain one or more software modules for calculating and plotting a derivative curve of the current and/or induction of the example braking assembly 54, determining the region of interest compatible when the mobile plates 60 of the example braking assembly 54 is anticipated or expected to move, identifying the minimum point in the derivative curve and the maximum point in the derivative curve within the region of interest, and determining an absolute difference value (amplitude change) between the minimum point and the maximum point along with an expected time duration between the minimum point and the maximum point.

Further, the derivative logic 538 uses the mathematical expressions and/or formulas embedded within algorithms or other programs to calculate the movement of the mobile plates 60 of the example braking assembly 54. For example, Equation (1) below illustrates determining a movement of the mobile plates 60 of the example braking assembly 54 similar to determining movement of a plunger in a solenoid:

$$v_s = Rc(i) + L\frac{di}{dt} + i\frac{dl}{dx}\left(\frac{dx}{dt}\right) \tag{1}$$

where Vs is a voltage provided by a power supply that does not change in time after energized; Rc is a coil resistance that changes with temperature; i is coil current that changes with supply voltage Vs and coils resistance Rc and the mobile plates 60 at a speed dx/dt; L is the inductance that changes with the position of the moveable plate; is $$\frac{di}{dt}$$

a current rate of change, $$\frac{dl}{dx}$$

is the inductance change rate with mobile plates 60 position; and $$\frac{dx}{dt}$$

is the mobile plates 60 speed that may be affected by an air gap, clearances, friction, and the like.

As such, when the mobile plates 60 of the example braking assembly 54 is stuck (e.g., not moving) Equation (1) may be simplified to Equation (2) to illustrate that current grow/decay for brake lift/drop exponentially:

$$v_s = Rc(i) + L\frac{di}{dt} \tag{2}$$

The derivative logic 538 may determine or calculate the derivative of the current of the example braking assembly 54 using a second order transfer function. For example, in simulation, Equation (3) illustrated below may be used to adjust an output of the second order transfer function in the s domain to the input data:

$$H_1(s) = \frac{\omega_n^2}{s^2 + 2\zeta\omega_n s + \omega_n^2} \tag{3}$$

where $H_1(s)$ is an output of the second order transfer function in the s domain; $\omega_n$=(2)(π)(fn) where fn is an undamped natural frequency; ζ is the damping ratio that needs to be=0<ζ>1.0 to have an underdamped system.

Once the second order transfer function is fit to the input data (e.g., the output of the second order transfer function is adjusted to specific brake data for the example braking assembly 54), by adding "s" to the numerator, the derivative logic 538 may determine or calculate the derivative of the braking current signal of the example braking assembly 54 using Equation (4) illustrated below:

$$H_2(s) = \omega_n^2\left(\frac{s}{s^2 + 2\zeta\omega_n s + \omega_n^2}\right) \tag{4}$$

It should be understood that by properly selecting the transfer function parameters, the effect of movement of the mobile plates 60 of the example braking assembly 54 may be magnified in the derivative signal. A bilinear transformation may be used to convert the solution of $H_2(s)$ into a discrete solution such that the solution may be implemented into software. The transfer function may be initialized in software, as best illustrated in FIG. 24. As illustrated in FIG. 24, the transfer function coefficients are changed, based on brake stage lifting and/or dropping, by changing @n. As such, when the example braking assembly 54 is in the lift state (retracted from the friction disc 62 such that the brake is disengaged), the frequency fn=5 Hz otherwise the system assumes the mobile plates 60 are engaged and the frequency fn=10 Hz. T is set to $$T = \frac{1.0}{\text{sample rate}}.$$

In non-limiting examples, zeta (ζ)=0.7 (0<ζ<1.0), ω is set at a range from around 20 Rad/s ((2)(π)(3 Hz)) up to around 190 Rad/s ((2)(π)(30 Hz) such that pole placement is defined. As such zeta (ζ) defines how fast there is an attenuation and omega (ω) is the natural frequency. These define the integrator value between minimum point and the maximum points. The variables b, a1, a2, and a3 are used in the discretization process to transform into the discrete form.

As such, the derivative calculation when the brake is the lift or drop position is as follows as an expression illustrated as Equation (5):

$$dsdt = \frac{1.0}{a1} - (a2(dsdt_1)) - (a3(dsdt_2) + (b(s_{in} - s_2)) \tag{5}$$

where $s_{in}$ is the brake current input and dsdt is the derivative of brake current.

It should be appreciated that the following expression illustrated as Equation 6 may be used in each iterative loop of the digital signal processor:

$$dsdt(i) = \frac{1.0}{a1}(-a2(dsdt(i-1))) - (a3(dsdt(i-2))) + (b(s(i) - s(i-2))) \tag{6}$$

where s(i) and dsdt(i) are the input and output digitalized signals for various samples i, respectively. That is, various samples are gathered at various discrete times, such as at a1, a2, a3 and the current at those times (i) is the digitalized signal at those intervals.

Still referring to FIG. 5B, the integral logic 539 may contain one or more software modules for calculating and plotting an area under the derivative curve of the current and/or induction of the example braking assembly 54 and the integral value for this area is then compared with a threshold value to determine whether each of the mobile plates 60 has actually moved as expected. The integrated area is calculated continuously and is restricted to between minimum and maximum points, with maximum point occurring after minimum point, as discussed in greater detail herein. As such, in some cases, it is necessary to disregard areas under the derivative curve if the area under the curve occurs outside expected region of interest (e.g., a region in time where the mobile plates 60 of the example braking assembly 54 are expected to move). In such cases, the integral logic 539 may determine to not accept the minimum point and the maximum point in regions where the derivative term is still too high, for example.

The integral logic 539 uses mathematical expressions and/or formulas embedded within algorithms or other programs to calculate the area under the derivative curve to determine whether there is movement of each of the mobile plates 60 of the example braking assembly 54. For example, Equation (7) below illustrates determining the integral value:

$$\text{Integral value} = \int_{t\_min}^{t\_max} \left(\frac{dI_{brake}}{dt}\right) dt - \min\left(\frac{dI_{brake}}{dt}\right) * (\text{t\_max} - \text{t\_min}) \tag{7}$$

where $I_{brake}$ is the brake current and $$\frac{dI_{brake}}{dt}$$

is the derivative of the brake and is used as the input for the illustrative method 1200, as discussed in greater detail herein.

Since the brake current ($I_{brake}$) is only minimally affected by the back electromotive force generated by movement of each of the mobile plates 60, the derivative ($dI_{brake}$/dt) is used as the method input. As such, the output of the second order transfer function is adjusted to specific brake data for the example braking assembly 54 and the derivative of the braking current is determined, as discussed above with respect to Equations (2)-(6). The integral logic 539 may then calculate the area under the derivative curve to determine whether there is movement of the mobile plates 60 of the example braking assembly 54.

It should be appreciated that the area threshold for determining whether the mobile plates 60 have moved may be a fixed value determined during installation or when the example braking assembly 54 is functioning in a desired manner. Further, the fixed value may be altered slightly to compensate for temperature (e.g., sensed from temperature sensor 34), driver voltage supply variations (e.g., sensed by voltage sensor 75), wear that causes various air gap changes, and the like. That is, the fixed value of movement of the mobile plates 60 may change based on temperature, supply voltage, wear and the like. As such, by changing or altering threshold values based on voltage supply and temperature (e.g., coil resistance changes with temperature changes), it is possible to compensate for these changes to the fixed value of movement of the mobile plates 60. Further, the compesentaiton may alter when the mobile plates 60 may move, the speed or how fast the movable plates move, the duration of the movement fo the mobile plates 60, and the like. In other embodiments, the integrator output (area) may also be used to estimate brake wear since it increases with the number of the machine brake operations.

Figure 20:
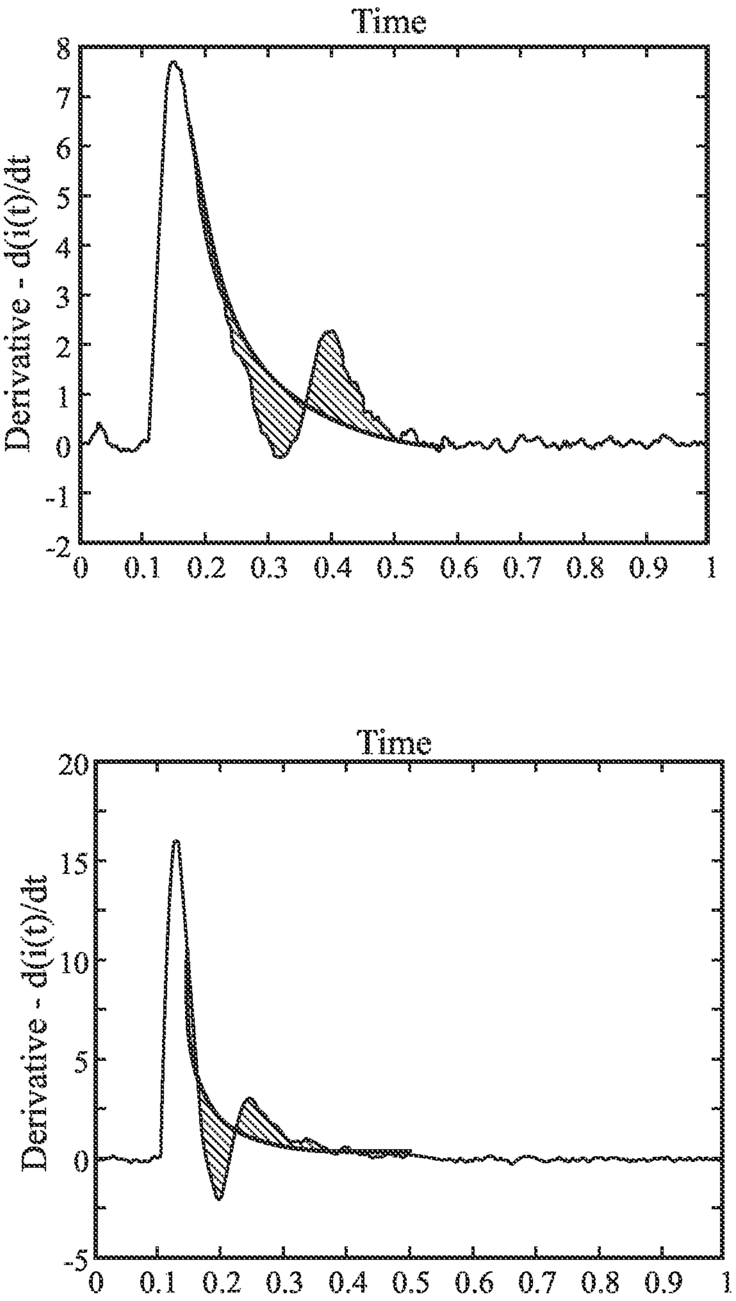
FIG. 20 schematically depicts a graphical representation of a quantity of movement of the mobile plates during brake lift is depicted in the upper graph and during the brake drop is depicted in the lower graph according to one or more embodiments shown and described herein.
Figure 21:
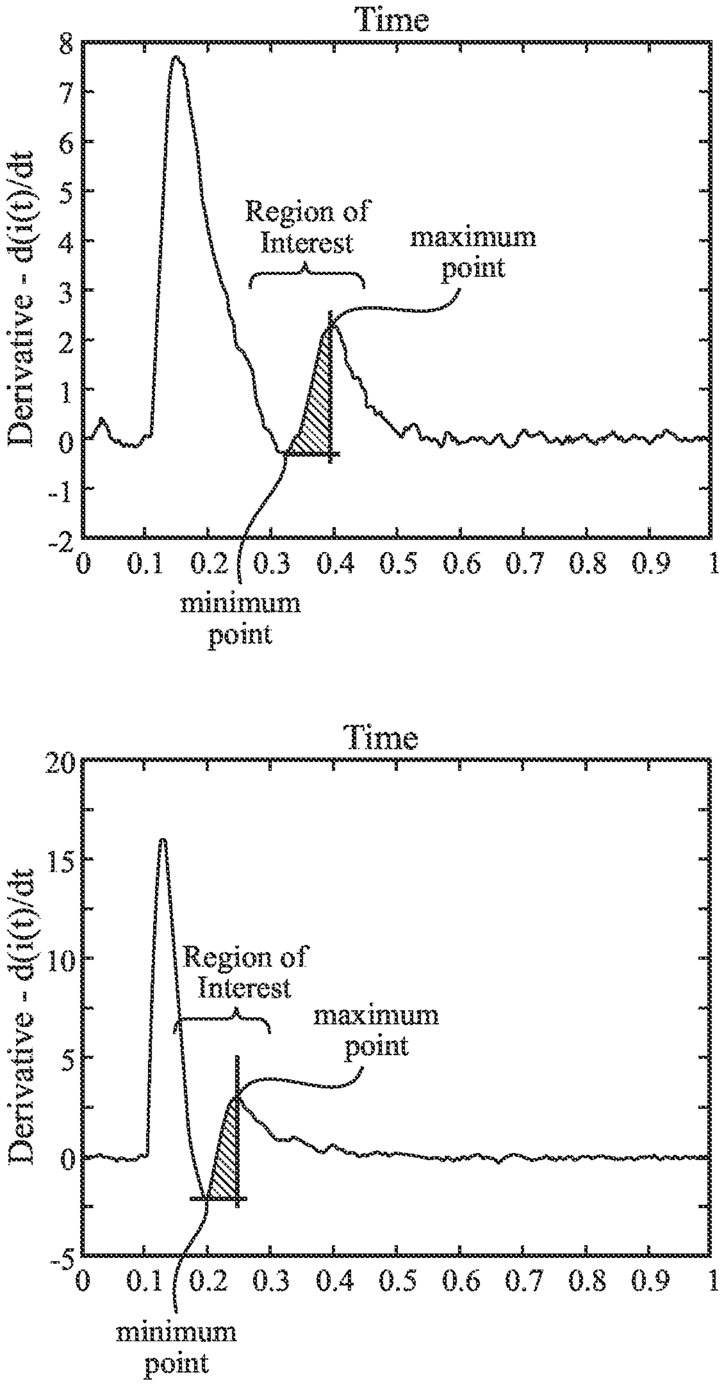
FIG. 21 schematically depicts a graphical representation of a quantity of movement of the mobile plates during brake lift located between minimum and maximum points is depicted in the upper graph and during the brake drop located between minimum and maximum points is depicted in the lower graph according to one or more embodiments shown and described herein.

It should be understood that FIGS. 13-19 and 22-23 are simulations incorporating the Equations (1)-(6) and the algorithms in FIG. 24 to plot and graphically illustrate the derivative of the braking current, as discussed in greater detail herein. Further, FIGS. 20-21 are simulations incorporating Equation (7) to plot and graphically illustrate the area under the derivative curve, as discussed in greater detail herein.

The current operating value logic 540 may contain one or more software modules for initiating the monitoring controller 70 to receive a signal indicative of the braking current of the example braking assembly 54. It should be appreciated that the gathering of the braking current may be continuous or may be performed at predetermined discrete times. In some embodiments, the gathering of the electrical signals (e.g., the braking current) may be at predetermined time intervals when the mobile plates 60 are expected to move. In other embodiments, the gathering of the electrical signals may be based on running or movement of the elevator cab 12 (FIG. 1A). For example, the initiation may occur after a predetermined number of floor movements, at each landing, and/or the like.

Still referring to FIGS. 1A, 3 and 5B, it should be understood that the current operating value logic 540, comparison logic 536, the derivative logic 538, the integral logic 539, the display logic 532, the alert logic 534, and the current operating value logic 540 may simultaneously operate, in real time, and may determine when the mobile plates 60 of the example braking assembly 54 together or individually are not moving (e.g., remaining engaged or disengaged), to alert the user, the elevator controller 430 (FIG. 4) and/or display the data such that a maintenance technician may be contacted and such that the elevator cab 12 (FIG. 1A) is stopped from moving when an undesirable condition is detected. As such, the position of each of the mobile plates 60 of the example braking assembly 54 of the elevator assembly 10 may be remotely and passively monitored and/or tracked to monitor data without the need for additional sensors, holders, ducts, wiring, adjusting, and regular maintenance, as found in conventional systems.

Figure 5C:
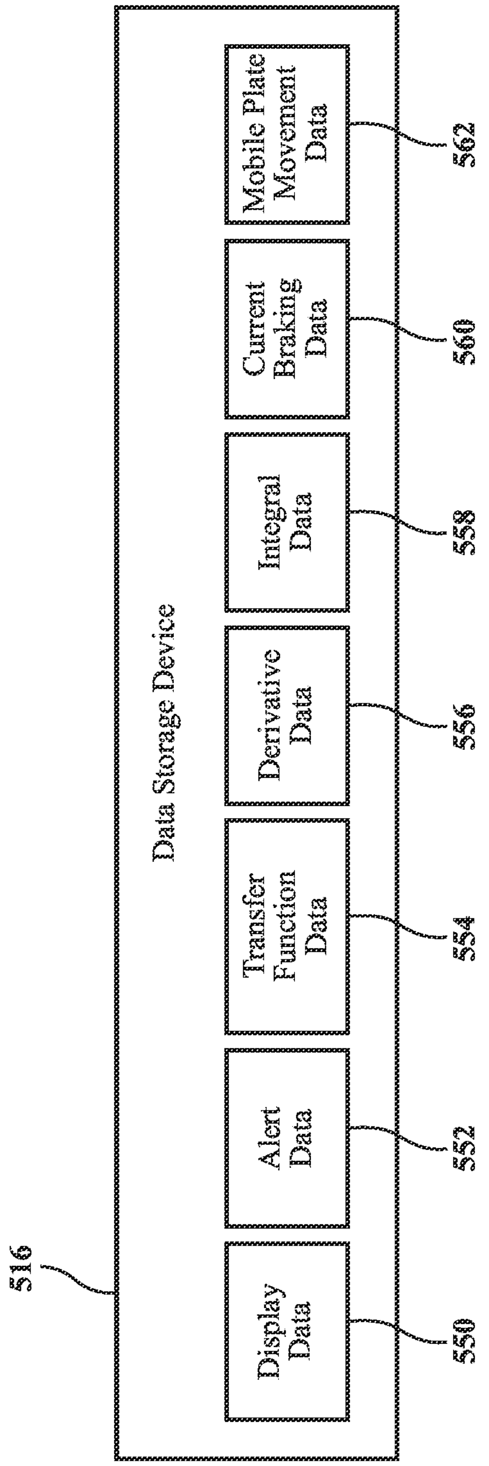
FIG. 5C schematically depicts an illustrative data storage device containing illustrative data components according to one or more embodiments shown and described herein.

FIG. 5C schematically depicts a block diagram of various data contained within a storage device (e.g., the data storage device 516). It should be understood that the data storage device 516 may reside local to and/or remote from the monitoring controller 70 and may be configured to store one or more pieces of data for access by the monitoring controller 70 and/or other components, to determine a derivative of the braking current and an area under the derivative curve to determine whether the mobile plates 60 of the example braking assembly 54 (FIG. 3) are each moving and in the correct state or position.

As shown in FIG. 5C, the data storage device 516 may include, for example, a plurality of display data 550, such as data related to the plotted derivative and/or area under the derivative curve for the braking current and/or inductive levels, and the like, that may be displayed graphically, such as a line chart, indicators, bar charts, column charts, pie charts, area charts, pivot tables, bubble charts, tree maps, polar charts, scatter charts, and/or the like.

Still referring to FIG. 5C and back to FIGS. 1A and 3, the data storage device 516 further includes the alert data 552, such as different predetermined or user customized threshold values for the absolute difference value or amplitude difference between the minimum point and maximum point within the area of interest, the time duration, the area predetermined threshold value, and the like. For example, the alert data 552 may include data related to various output fault states. For instance, the alert data 552 may be populated with data related to at least one threshold level with respect to the derivative of the braking current and/or area under the derivative curve. For example, where the positioning of the mobile plates 60 would cause an ascending cab over speed or an unintended cab movement, an alert may be sent to the elevator controller 430 (FIG. 4) to inhibit further movement of the elevator cab 12, 12' (FIGS. 1A-1B) and may require a technician to replace and/or repair the example braking assembly 54.

In other examples, a different alert may alert a technician that some degradation is occurring to the example braking assembly 54, which may require a technician to perform additional checks, maintenance, further investigation, and/or the like.

The data storage device 516 further includes the transfer function data 554. The transfer function data 554 may include data related to the variables of the second order transfer function such as frequency and the like. Further, the transfer function data 554 may include data related to the specific transfer function coefficients that are based on brake stage lifting and/or dropping for the example braking assembly 54. Different braking assemblies may have different coefficients and thus varying transfer functions outputs.

Still referring to FIGS. 1A, 3 and 5C, the data storage device 516 may further include the derivative data 556. The derivative data 556 may include data computed through the various algorithms discussed herein. As such, the derivative data 556 may include data related to the plotting of the derivative curve, the minimum point and maximum point, data relating to the region of interest, amplitude and time. The derivative data 556 may include other data changes due to various factors, such as temperature variances within the hoistway 16. That is, temperature changes in the hoistway 16 may influence or change the current, or real-time measured braking current and affect the derivative calculation, as discussed herein. The derivative data 556 may further include data populated by the at least one temperature sensor 34 positioned in the hoistway 16. For example, the temperature within the hoistway 16 at 8:00 AM may be vastly different than the temperature within the hoistway 16 at 3:00 PM. As such, the temperature variance may be offset to eliminate erroneous data.

The data storage device 516 may further include the integral data 558. The integral data 558 may be the data computed through the various algorithms discussed herein. As such, the integral data 558 may include data related to the determination of the area under or above the derivative curve, the minimum point and maximum point, data relating to the region of interest, amplitude and time.

Still referring to FIGS. 1A, 3 and 5C, the data storage device 516 may further include the current braking data 560. The current braking data 560 may include data received from the example braking assembly 54 indicative of the braking current of the example braking assembly 54, for example the coils 64 that is used to move the mobile plates 60 from contact with the friction disc 62 to be spaced apart from the friction disc 62. The data storage device 516 may further include the mobile plate movement data 562. The mobile plate movement data 562 may include data received from the example braking assembly 54 and/or the elevator controller 430 indicative of the expected movement of the mobile plates 60, data regarding the type of the example braking assembly 54, and the like.

As mentioned above, the various components described with respect to FIGS. 5A-5C may be used to carry out one or more processes to improve accuracy of determining undesirable conditions of the example braking assembly 54 within an elevator assembly 10 using the derivative of the braking current to amplify the peaks and valleys so that a determination of the current position and/or movement of the mobile plates 60 may be made. Further, an area under the derivative curve may be used to determine whether the mobile plates 60 have moved or changed states as expected. When the mobile plates 60 are stuck or do not move from either the lifted position of the dropped positon, the various components described with respect to FIGS. 5A-5C may be used to alert a technician and/or to inhibit further movement of the elevator cab 12 (FIG. 1A).

Further, it should be understood that the components depicted in FIGS. 5A-5C are merely illustrative and are not intended to limit the scope of this disclosure. More specifically, while the components in FIGS. 5A-5C are illustrated as residing within the monitoring controller 70, this is a non-limiting example. In some embodiments, one or more of the components may reside external to the monitoring controller 70. Similarly, while FIGS. 5A-5C is directed to the monitoring controller 70, other components such as the electronic computing device 410, the server computing device 420, and/or the elevator controller 430, as depicted in FIG. 4, may include similar hardware, software, and/or firmware.

Now referring to FIGS. 1A-4 and 6, a graphical representation of three current curves based on movement behaviors of the mobile plates 60 of the example braking assembly 54 that occur during a brake cycling process is depicted. As discussed above, depicted by a solid line in FIG. 6, the example braking assembly 54 is supplied with a constant voltage source and the movement of each of the mobile plates 60 is proper from the dropped position to lifted position and from the lifted position to the dropped position. The depicted dotted line in FIG. 6 illustrates a condition when the mobile plates 60 of the example braking assembly 54 is in the dropped position (engaged against the friction disc 62 to engage the brake to inhibit movement of the traction sheave 18*a*) and does not change positions or states as expected. The depicted dashed line in FIG. 6 illustrates a condition when the mobile plates 60 are in the lifted position (retracted from the friction disc 62 such that the brake is disengaged permitting the traction sheave 18*a* to move or rotate) and does not change positions or states as expected.

Figure 7:
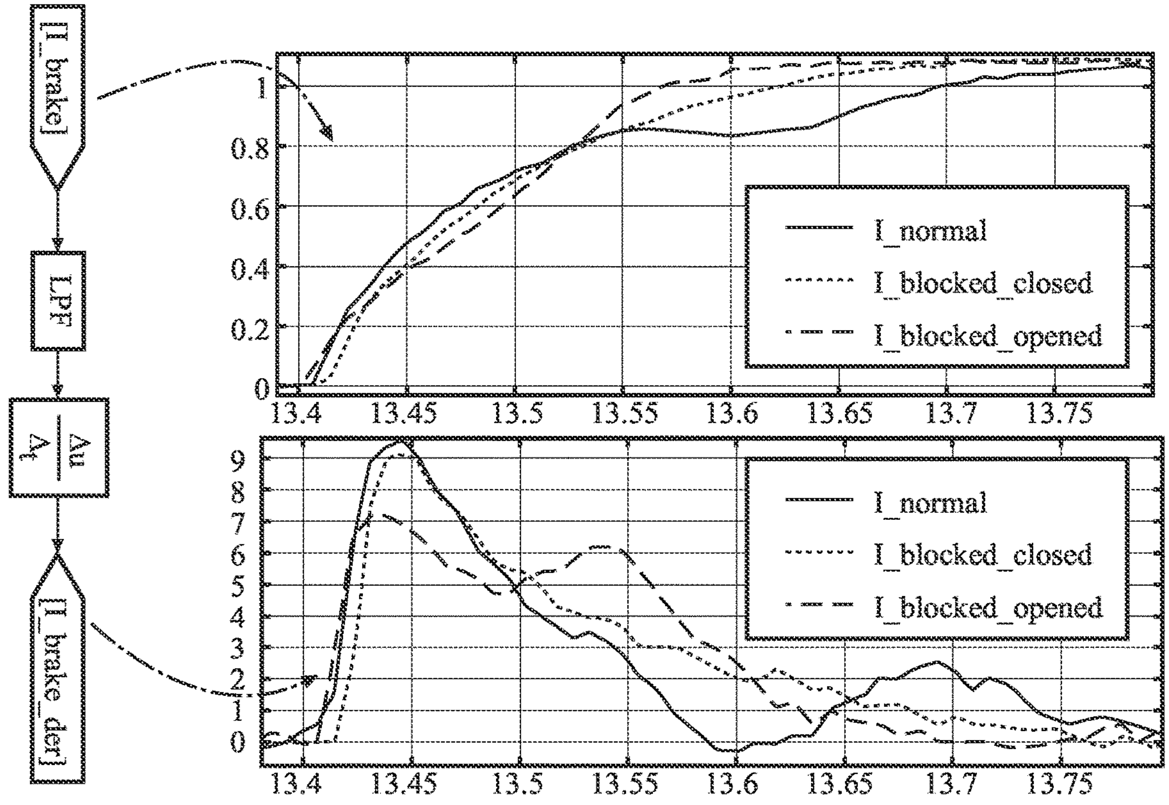
FIG. 7 schematically depicts a graphical representation of a braking current that is acquired in the monitoring controller is depicted in the upper graph and a derivative of the braking current acquired over the brake cycling process is depicted in the lower graph according to one or more embodiments shown and described herein.

FIG. 7 schematically depicts a graphical representation of the braking current that is acquired in the monitoring controller 70 during the brake lifting phase (e.g., energizing the coils 64 to move the mobile plates 60 of the example braking assembly 54). As such, plotting of the braking current alone, as depicted for the various conditions (e.g., a solid line illustrating when the example braking assembly 54 is supplied with a constant voltage source and the mobile plates 60 are moving properly, the dotted line illustrating a condition when the mobile plates 60 remain in the dropped position and the dashed line illustrating when the mobile plates 60 remain in the lifted position), does not necessary plot with a depression or peak during movement or non-movement of the mobile plates 60. As such, in instances, the gradient changes of the plotted braking current is minimal. This makes it extremely difficult to analyze and determine whether the example braking assembly 54 is operating correctly or has failed.

Figure 10:
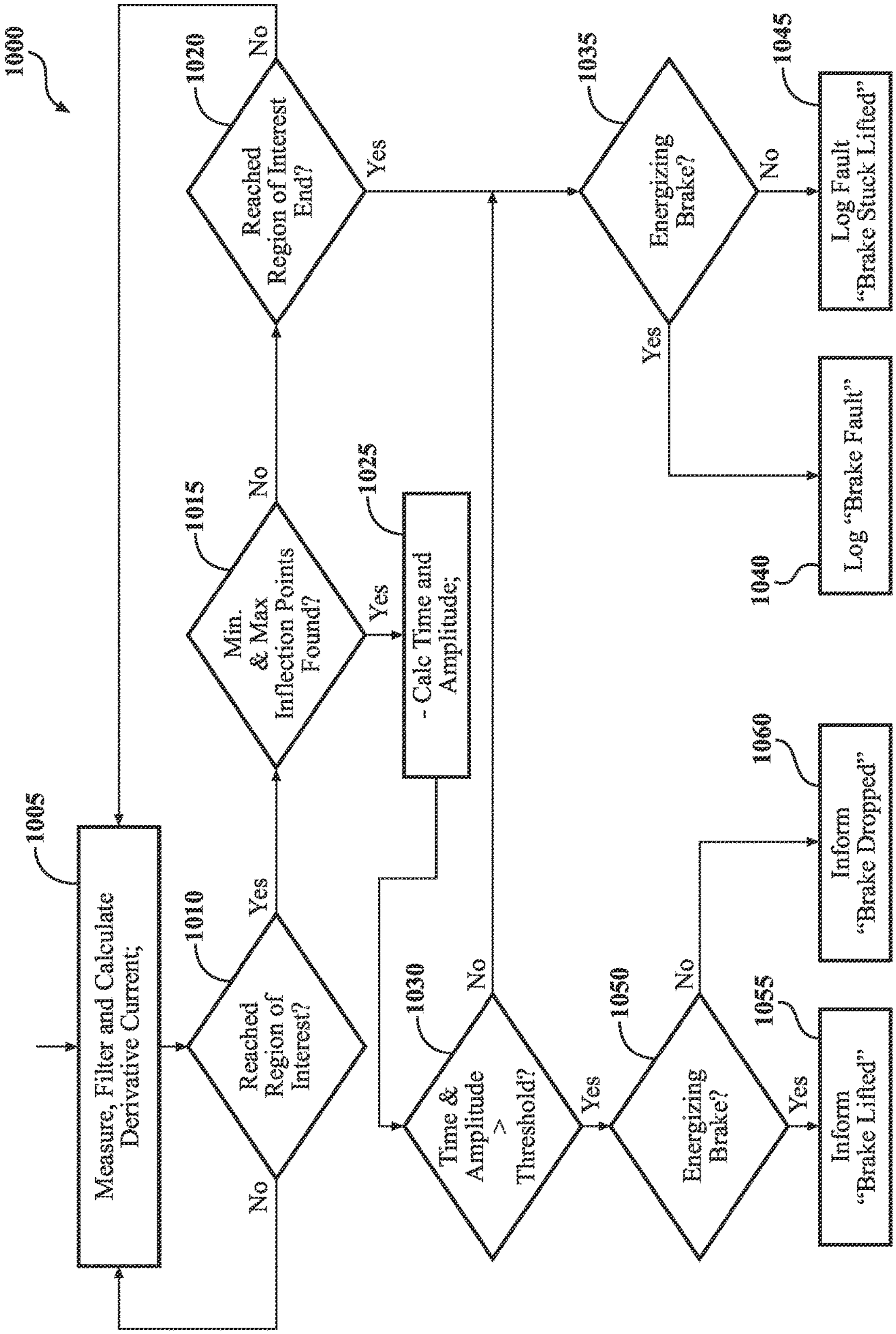
FIG. 10 depicts a flow diagram of an illustrative method for determining the region of interest of FIG. 9 and a subsequent fault according to one or more embodiments shown and described herein.

As such, the embodiments described herein with respect to at least FIG. 10 amplifies the effect of the movement or non-movement of the mobile plates 60 over the entire braking cycle using a derivative of the braking current, as depicted in the lower graph of FIG. 7. As depicted in the lower graph of FIG. 7, the peaks and valleys are clearly amplified and more pronounced using the derivative curve compared with the conventional braking current plot in the upper graph of FIG. 7. As such, a region of interest, minimum and maximum points of the derivative curve within the region of interest, an amplitude of the minimum and maximum points and a duration between the minimum and maximum points may more easily be plotted and analyzed according to the embodiments as described in greater detail herein.

Figure 8:
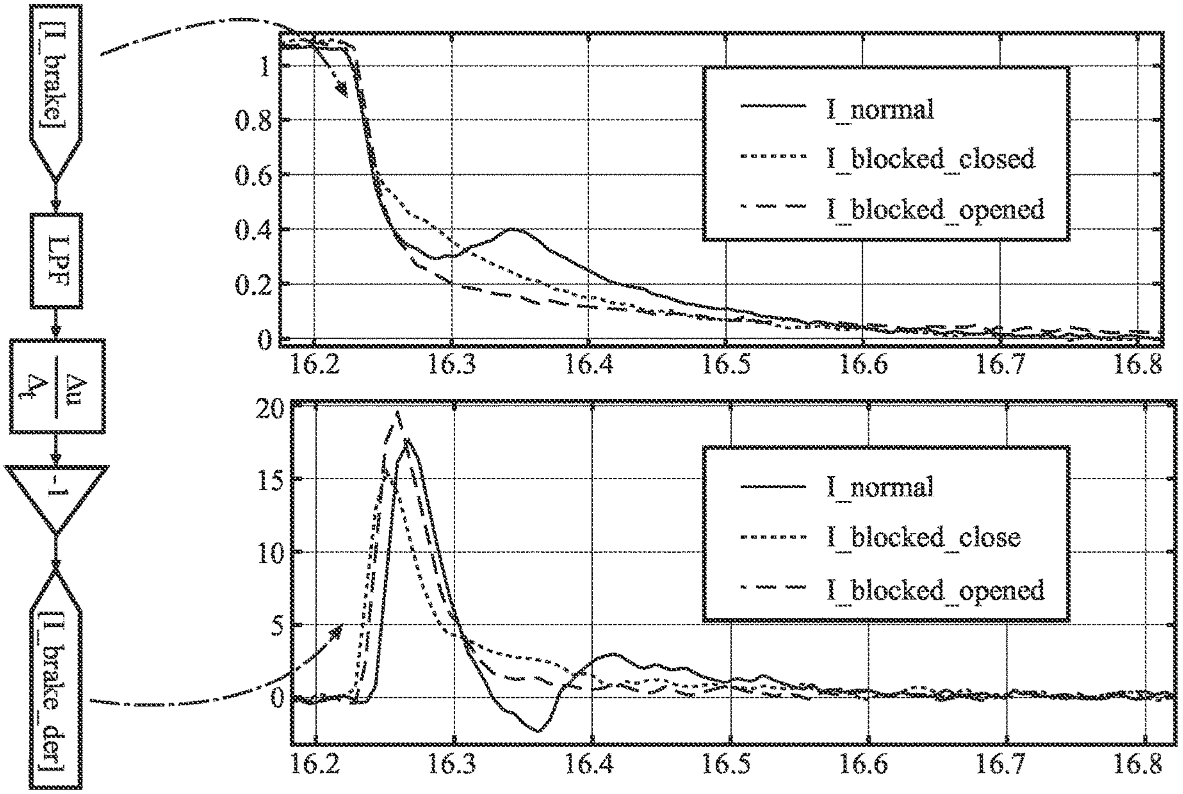
FIG. 8 schematically depicts a graphical representation of the braking current that is acquired in the monitoring controller during a brake dropping phase is depicted in the upper graph and the derivative of the braking current acquired during the brake dropping phase is depicted in the lower graph according to one or more embodiments shown and described herein.

FIG. 8 schematically depicts a graphical representation of the braking current that is acquired in the monitoring controller 70 during the brake dropping phase (e.g., removing power supply to the coils 64 such that the springs 56 move or return the mobile plates 60 of the example braking assembly 54 against the friction disc 62). As illustrated, plotting of the braking current alone, as depicted for the various conditions (e.g., a solid line illustrating when the example braking assembly 54 voltage source is removed (switch 74 of FIG. 3 changes to open state) and the mobile plates 60 are moving properly, the dashed line illustrating a condition when the mobile plates 60 remain in the dropped position and the dashed-dot-dashed line illustrating when the mobile plates 60 remain in the lifted position), does not necessary plot with a depression or peak during movement or non-movement of the mobile plates 60 and/or plots with a peak that does not include the minimum point before the maximum point.

Similar to FIG. 7, this makes it extremely difficult to analyze and determine whether the example braking assembly 54 is operating correctly or has failed. As such, using the derivative plot, as illustrated in the lower graph of FIG. 8, the region of interest, minimum and maximum points of the derivative curve within the region of interest, the amplitude of the minimum and maximum points and the duration between the minimum and maximum points may more easily be plotted and analyzed according to the embodiments as described in greater detail herein. Further, it should be understood that the derivative plots of the lifting of FIG. 7 and the dropping of FIG. 8 are similar, making the analyses and determination discussed with respect to FIG. 10 uniform and easier than compared to conventional systems.

Figure 9:
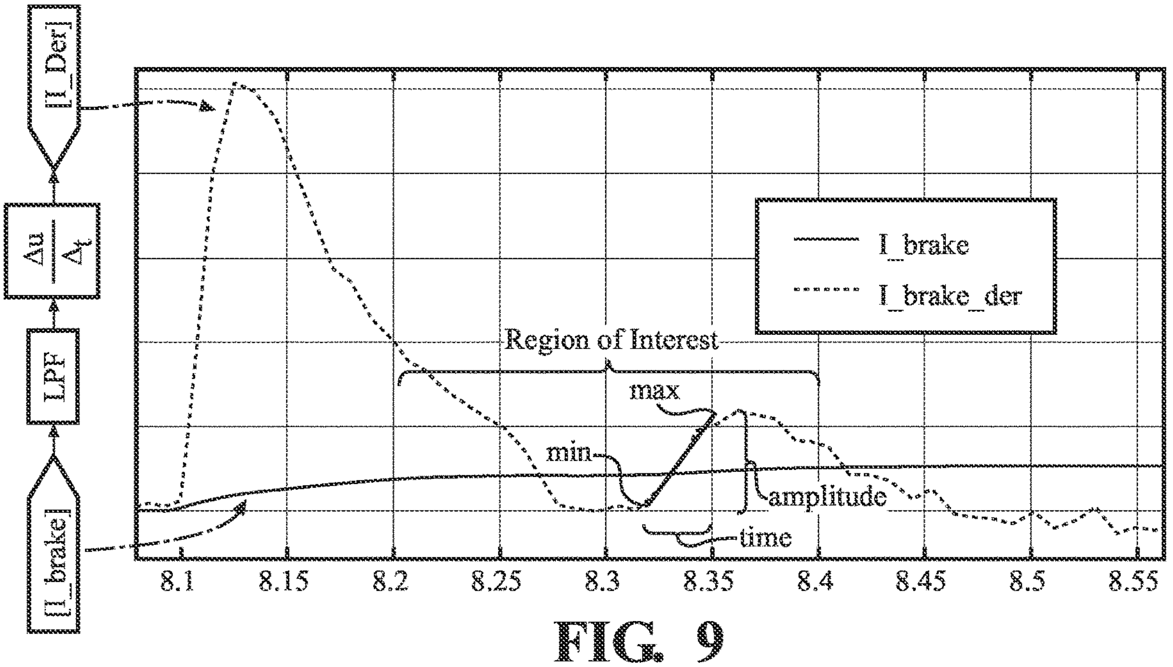
FIG. 9 schematically depicts a graphical representation of an illustrative region of interest of the derivative of the braking current according to one or more embodiments shown and described herein.

FIG. 9 schematically depicts a graphical representation of the braking current and the derivative of the braking current including the region of interest, amplitude and time duration. As illustrated, in the braking current graph, there is no indication within the region of interest whether the mobile plates 60 are moving as expected or whether there is a failure of the example braking assembly 54. The plotted derivative graph clearly illustrates an inflection in the region of interest (e.g., where there is expected to be a movement of the mobile plates 60) where the minimum point occurs before the maximum point and where there is an absolute amplitude of the inflection between the two points and a time duration between the two points. As such, for example, the long dashed line in the lower graph of FIG. 7 would indicate a failure of the example braking assembly 54.

Referring back to FIGS. 2A-4 and 7-9, and now also to FIG. 10, a flow diagram that graphically depicts an illustrative method 1000 of determining the region of interest and whether there is a subsequent fault is provided. Although the steps associated with the blocks of FIG. 10 will be described as being separate tasks, in other embodiments, the blocks may be combined or omitted. Further, while the steps associated with the blocks of FIG. 10 will be described as being performed in a particular order, in other embodiments, the steps may be performed in a different order.

At block 1005, the braking current of the example braking assembly 54 is sensed by the sensor 80, which is then smoothed through the low pass filter 82 and the signal or data is converted from an analog to a digital signal in the a-d converter 84 indicative of the braking current of the example braking assembly 54. The derivative of the braking current, now a digital signal is determined and may be plotted, as illustrated and discussed with respect to FIGS. 7-9. In some embodiments, the entire braking cycle may be plotted as the illustrative derivative curves shown in at least FIGS. 7-9. In other embodiments, the plot may only between two discrete points and is continuously moved or updated in real time. As such, the use of the term “plot” or “plotting” is non-limiting and may mean a plurality of consecutive points are connected, two points are connected or an array of points is virtually connected and analyzed without actually being plotted as a curve.

At block 1010, a determination is made whether the derivative curve includes a region of interest. The region of interest is determined by determining whether there is an expected movement of the mobile plates 60 of the example braking assembly 54. If there is not a determined region of interest, the method 1000 loops back to block 1005 and continues this iterative looping until a region of interest is determined. At block 1015, a determination is made to whether in the region of interest where the mobile plates 60 are expected to move, there are two inflection points where a minimum point occurs before a maximum point creating an amplitude of a time period of duration within the plot of the derivative curve.

If two inflection points are not identified, at block 1015, the method continues to determine whether the end of the region of interest has occurred, at block 1020. If the end of the region of interest has not occurred, the method loops back to block 1005 to continue to generate derivative curves based on the braking current of the example braking assembly 54.

If two inflection points are identified, at block 1015, then a calculation is made, at block 1025, to determine the amplitude value between the minimum point and the maximum point (e.g. a measured difference between the minimum point and the maximum point) and a time duration between the minimum point and maximum point (e.g., the time duration occurring between the occurrence of the minimum point and the occurrence of the maximum point). The absolute difference value (amplitude) between both inflection points is compared to a predetermined threshold value, at block 1030, to determine whether the mobile plates 60 of the example braking assembly 54 are moving at the expected time, between the expected positions, and at the expected speed. That is, the absolute difference value between the minimum point and the maximum point is compared to the predetermined threshold value and separately, or independently, the duration in time between the minimum point and the maximum point is compared to a predetermined time threshold value.

If, at block 1030, the determined time duration and/or the difference value between the minimum and maximum points does not exceed the threshold levels (e.g., the predetermined threshold value and/or the predetermined time threshold value), or if the region of interest has concluded or ended without recognizing the required two inflection points, at block 1020, then a determination is made, at block 1035, whether the example braking assembly 54 is energized. If it is determined that the example braking assembly 54 is energized, then, at block 1040, a brake fault is logged and an alert may be generated and transmitted to the elevator controller 430 to inhibit movement of the elevator cab 12 from further travel. Further, a notification may be generated notifying a technician of the brake fault. If it is determined that the example braking assembly 54 is not energized, then, at block 1045, a brake stuck lifted fault is logged and an alert may be generated and transmitted to the elevator controller 430 to inhibit movement of the elevator cab 12 from further travel. Further, a technician may be notified of the brake fault and the inhibiting movement of the elevator cab 12. As such, the analyses of the derivative curve is to determine whether a pair of inflection points has occurred during the region of interest where one of the inflection points is a minimum point and the other is a maximum point and the maximum point has a greater value than the minimum point and occurred after the minimum point or when the pair of inflection points do not occur during the region of interest. When either of these conditions occur, an alert may be output to the elevator controller 430 to instruct the elevator controller 430 to inhibit movement of the elevator cab 12.

If, at block 1030, the determined time duration and amplitude between the minimum and maximum points meets and/or exceeds the threshold levels, then a determination is made, at block 1050, whether the example braking assembly 54 is energized. If it is determined that the example braking assembly 54 is energized, then, at block 1055, a brake lifted (the mobile plates 60 are disengaged from the friction disc 62) is logged and the elevator assembly 10 may be notified that the example braking assembly 54 is functioning as expected. If it is determined that the example braking assembly 54 is not energized, then, at block 1060, a brake dropped (the mobile plates 60 are engaged with friction disc 62) is logged and the elevator assembly 10 may be notified that the example braking assembly 54 is functioning as expected.

Figure 12:
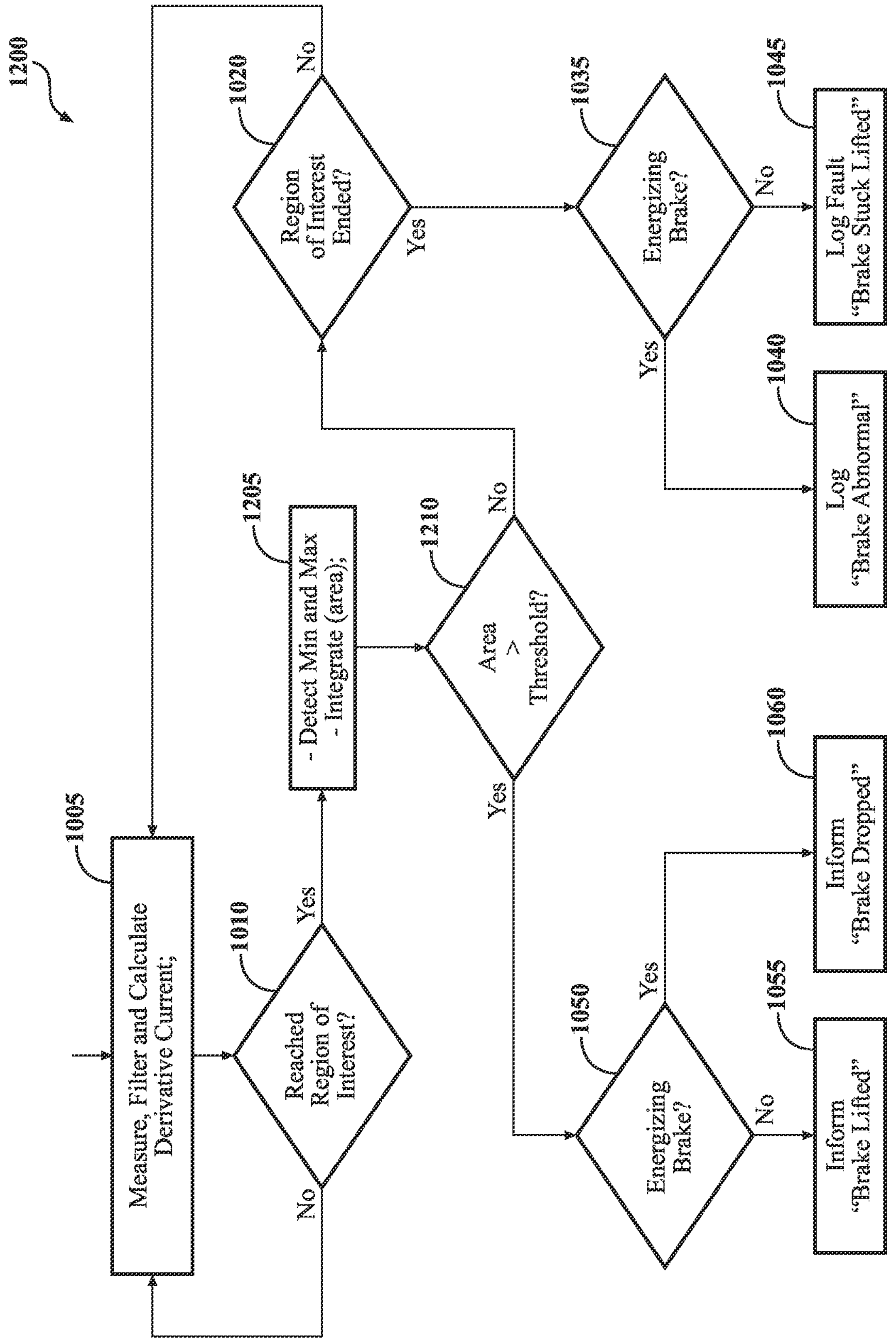
FIG. 12 depicts a flow diagram of an illustrative method for determining the integrated area below the derivative curve according to one or more embodiments shown and described herein.

As such, the method 1000 is continuously monitoring the braking current and is utilizing the amplified inflection points found in the derivative curve (or integral of the derivative curve as discussed with respect to FIG. 12) to determine where a minimum point occurs first and is less than a maximum point and an absolute difference (amplitude) between both the inflection points is determined and compared to an expected position of the mobile plates 60 and at an expected speed over a time period while moving the mobile plates 60 from an initial to a final position to determine whether the example braking assembly 54 is functioning correctly or whether a command and/or an alert should be generated and transmitted to inhibit movement of the elevator cab 12.

Figure 11:
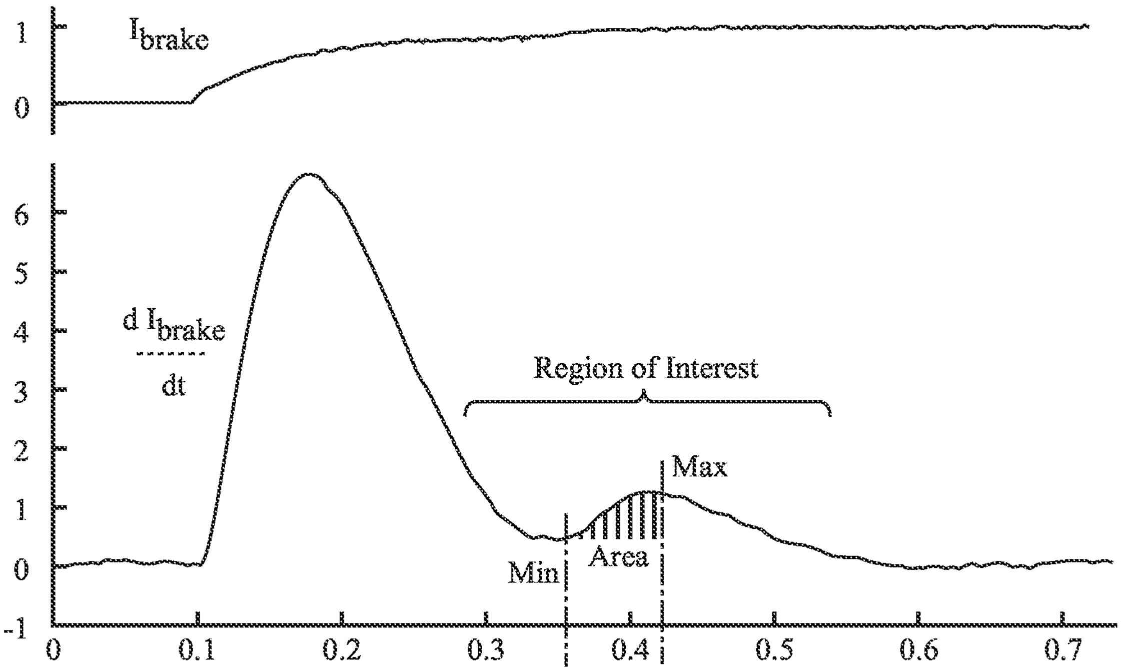
FIG. 11 schematically depicts a graphical representation of an illustrative integrated area below the derivative curve according to one or more embodiments shown and described herein.

Referring now to FIG. 11, a graphical representation of an illustrative integrated area below the derivative curve is schematically depicted. The amount of movement of the mobile plates 60 may also be calculated by computing the area below the derivative curve, as illustrated in FIG. 11 and discussed with respect to FIG. 12. Similar to the derivative curve, and analysis discussed herein, the integral value may be determined and compared to a threshold value to determine whether the mobile plates 60 have moved. As illustrated in FIG. 11, similar to FIG. 9, the derivative curve is plotted from the braking current plot, and the area under the derivative curve that has been calculated and hashed corresponds to the region of interest and is located between the minimum point and the maximum point. That is, the integrated area may be calculated continuously and may be restricted between minimum and maximum points. Further, the integrator output area may also be used to estimate brake wear since it increases with the number of the machine brake operations.

Referring back to FIGS. 2A-4 and 7-11, and now also to FIG. 12, a flow diagram that graphically depicts an illustrative method 1200 of determining an area under the derivative curve is provided. Although the steps associated with the blocks of FIG. 12 will be described as being separate tasks, in other embodiments, the blocks may be combined or omitted. Further, while the steps associated with the blocks of FIG. 12 will be described as being performed in a particular order, in other embodiments, the steps may be performed in a different order. Further, the illustrative method 1200 includes steps or blocks from the illustrative method 1000, which are discussed in greater detail with reference to FIG. 10 and are incorporated into the illustrative method 1200.

At block 1005, similar to FIG. 10, the braking current of the example braking assembly 54 is sensed by the sensor 80, which is then smoothed through the low pass filter 82 and the signal or data is converted from an analog to a digital signal in the a-d converter 84 indicative of the braking current of the example braking assembly 54. The derivative of the braking current, now a digital signal is determined and plotted, as illustrated and discussed with respect to FIGS. 7-9 and 11.

At block 1010, the region of interest for the current state of the example braking assembly 54 is determined (e.g., one region of interest for a brake lift and one for a brake drop). As such, depending on the state of the example braking assembly 54, the region of interest may be different. Further, the region of interest is a region where that mobile plates 60 are expected to move under all different conditions (e.g., a low voltage supply, a temperature, wear, and the like). As such, the region of interest is based on a determination of where there should always be an expected movement of the mobile plates 60 of the example braking assembly 54. If there is not a determined region of interest, the method 1000 loops back to block 1005 and continues this iterative looping until a region of interest is determined. At block 1205, the two inflection points where a minimum point occurs before a maximum point creating an amplitude of a time period of duration within the plot of the derivative curve is determined and the integrated area under the derivative curve between the minimum point and the maximum point is calculated.

At block 1210, a determination is made to determine whether the integrated area is compared to area predetermined threshold values to determine whether the integrated area is greater than the area predetermined threshold values. If the area is not greater than the area predetermined threshold values, then a determination is made to whether the end of the region of interest has occurred, at block 1020. If the end of the region of interest has not occurred, the method loops back to block 1005 to continue to generate derivative curves based on the braking current of the example braking assembly 54.

If, at block 1020, it is determined that the region of interest has concluded or ended, then a determination is made, at block 1035, whether the example braking assembly 54 is energized. If it is determined that the example braking assembly 54 is energized, then, at block 1040, a brake fault is logged and an alert may be generated and transmitted to the elevator controller 430 to inhibit movement of the elevator cab 12 from further travel. Further, a notification may be generated notifying a technician of the brake fault. If it is determined that the example braking assembly 54 is not energized, then, at block 1045, a brake stuck lifted fault is logged and an alert may be generated and transmitted to the elevator controller 430 to inhibit movement of the elevator cab 12 from further travel. Further, a technician may be notified of the brake fault and the inhibiting movement of the elevator cab 12.

If, at block 1210, the area is less than the area predetermined threshold values, then a determination is made, at block 1050, whether the example braking assembly 54 is energized. If it is determined that the example braking assembly 54 is energized, then, at block 1055, a brake lifted (mobile plates 60 disengaged from the friction disc 62) is logged and the elevator assembly 10 may be notified that the example braking assembly 54 is functioning as expected. If it is determined that the example braking assembly 54 is not energized, then, at block 1060, a brake dropped (mobile plates 60 engaged with friction disc 62) is logged and the elevator assembly 10 may be notified that the example braking assembly 54 is functioning as expected.

As such, the method 1200 is continuously monitoring the braking current and is utilizing the amplified inflection points only found in the derivative curve and taking the integral of the area under the derivative curve to determine whether the example braking assembly 54 is functioning correctly or whether a command and alert should be generated and transmitted to inhibit movement of the elevator cab 12. Further, the methods 1000 and 1200 may continuous and iteratively run and work in conjunction or simultaneous with one another.

Now referring to FIGS. 13-19 and 22-23, various simulations incorporating the Equations (1)-(6), the algorithms in FIG. 24, and the method 1000 of FIG. 10 to plot and graphically illustrate the derivative of the braking current and FIGS. 20-21 are simulations incorporating Equation (7) and the method 1200 of FIG. 12 to plot and graphically illustrate the area under the derivative curve, as discussed in greater detail herein.

Figure 13:
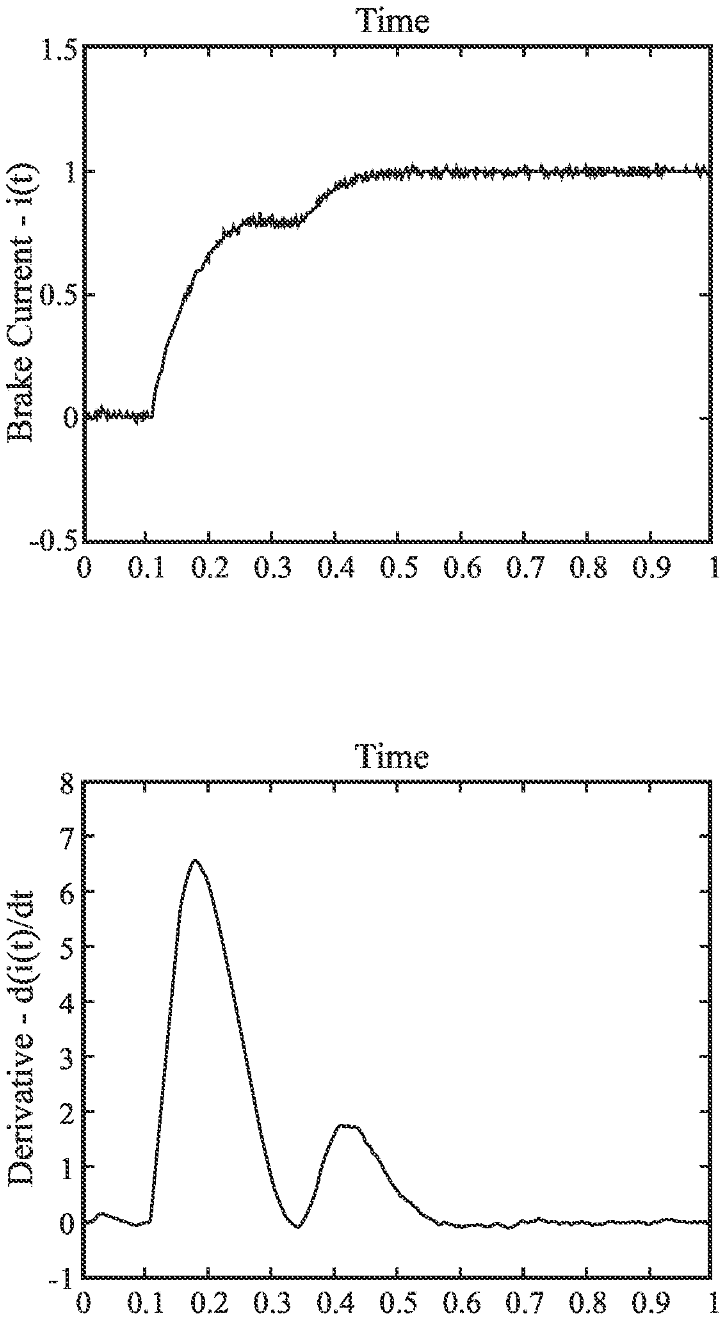
FIG. 13 schematically depicts a graphical representation of an input current indicative of movement of the mobile plates during a brake lift is depicted in the upper graph and its derivative for brake lift is depicted in the lower graph according to one or more embodiments shown and described herein.

Referring to FIGS. 3-4 and 13, where FIG. 13 depicts a simulation of a graphical representation of an input current indicative of movement of the mobile plates 60 during a brake lift is depicted in the upper graph and its derivative for brake lift is depicted in the lower graph.

Figure 14:
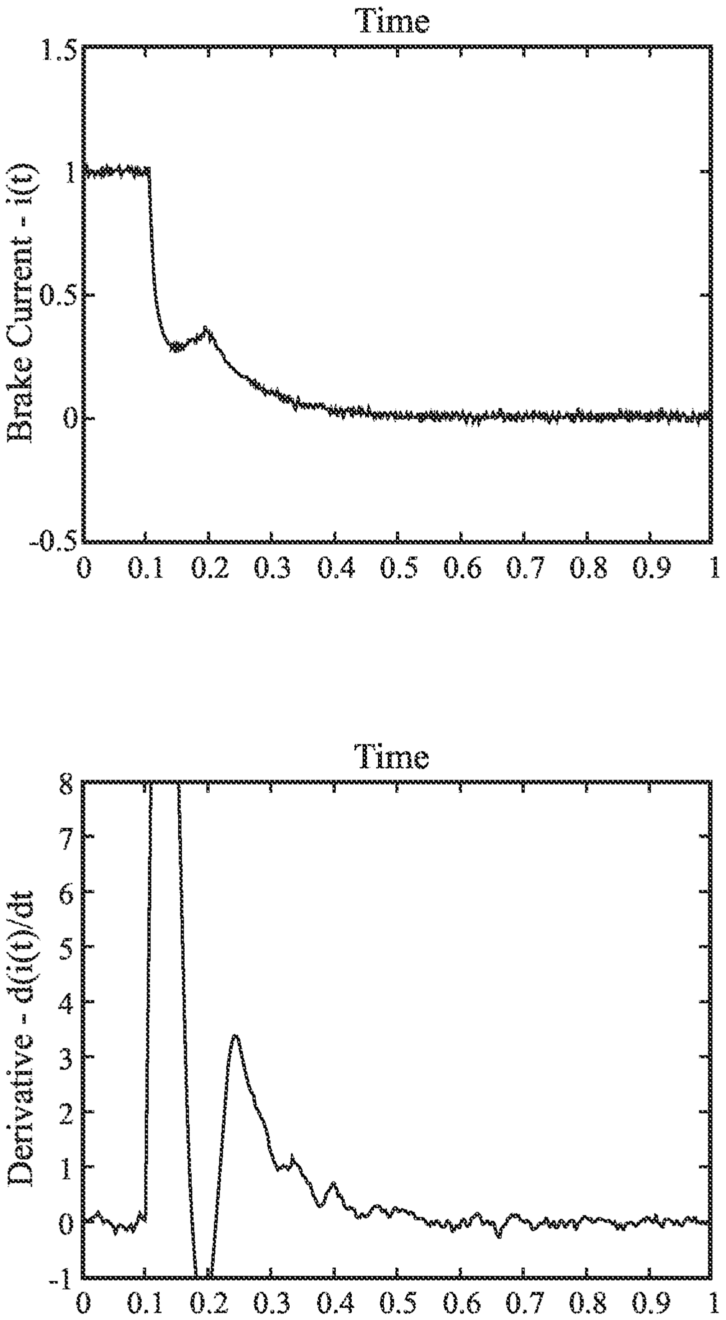
FIG. 14 schematically depicts a graphical representation of an input current indicative of movement of the mobile plates during a brake drop is depicted in the upper graph and its derivative for brake drop is depicted in the lower graph according to one or more embodiments shown and described herein.

Referring to FIGS. 3-4 and 14, where FIG. 14 schematically depicts a graphical representation of an input current indicative of movement of the mobile plates 60 during a brake drop is depicted in the upper graph and its derivative for brake drop is depicted in the lower graph.

Figure 15:
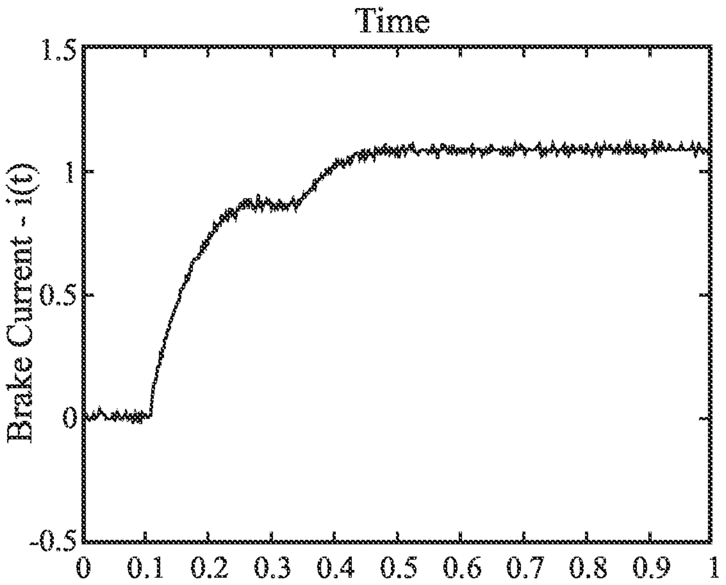
FIG. 15 schematically depicts a graphical representation of an input current indicative of movement of the mobile plates during a normal operation with brake lift is depicted in the upper graph and the drop is depicted in the lower graph according to one or more embodiments shown and described herein.
Figure 15:
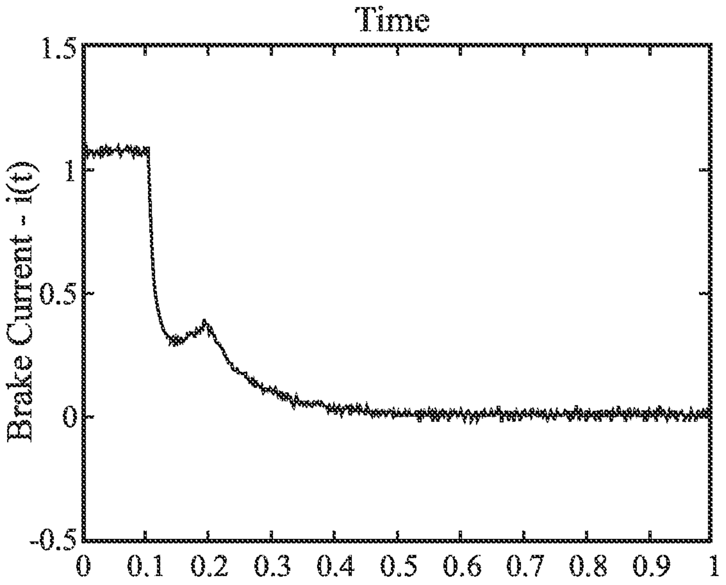

Referring to FIGS. 3-4 and 15, where FIG. 15 schematically depicts a graphical representation of an input current indicative of movement of the mobile plates 60 during a normal operation with brake lift is depicted in the upper graph and the brake drop is depicted in the lower graph.

Figure 16:
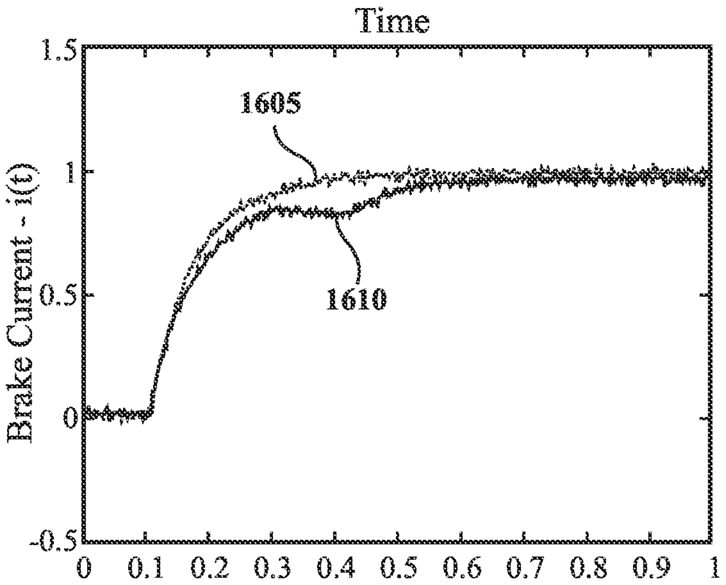
FIG. 16 schematically depicts a graphical representation of an input current indicative of movement of the mobile plates when the mobile plates do not move during brake lift cycle is depicted in the upper graph and the brake drop is depicted in the lower graph according to one or more embodiments shown and described herein.
Figure 16:
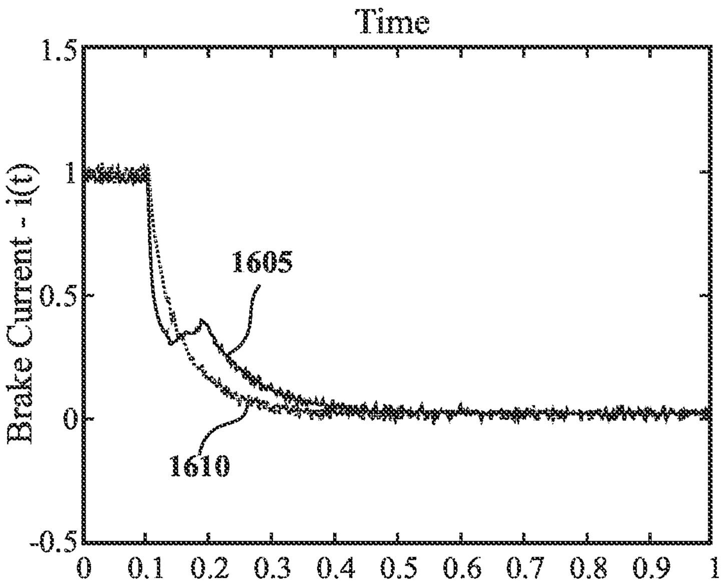

Referring to FIGS. 3-4 and 16, where FIG. 16 schematically depicts a graphical representation of an input current indicative of movement of the mobile plates 60 when the mobile plates 60 move depicted as curve 1605 and do not move during a brake lift cycle depicted as curve 1610 are depicted in the upper graph and the brake drop is depicted in the lower graph. As such, when the mobile plates 60 do not move, braking current will grow and/or decay exponentially for lift and drop phases. Further, there is not a minimum point and maximum point during the region of interest indicating a failure associated with the curve 1610.

Figure 17:
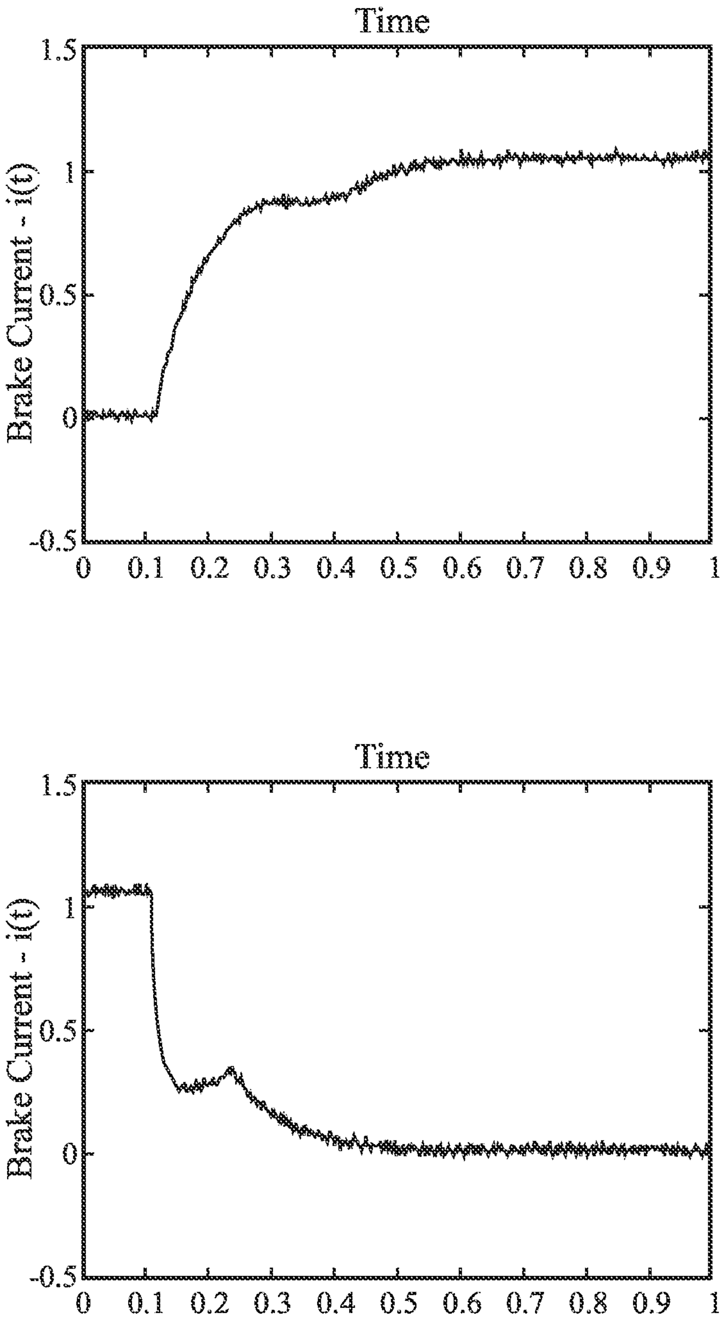
FIG. 17 schematically depicts a graphical representation of an input current indicative of movement of the mobile plates that only changes the rate of increase during brake lift is depicted in the upper graph and the brake drop is depicted in the lower graph according to one or more embodiments shown and described herein.

FIG. 17 schematically depicts a graphical representation of an input current indicative of movement of the mobile plates 60 that only changes the rate of increase during brake lift is depicted in the upper graph and the brake drop is depicted in the lower graph. As such, in instances where the mobile plates 60 still move properly, but in opposition to what normally happens, the movement of the mobile plates 60 has a minimal effect on the braking current and may only change the rate of increase during lift, for example. As such, without calculating the derivative of the braking current, such as in conventional systems, such a malfunction in the example braking assembly 54 would not be discovered.

Figure 18:
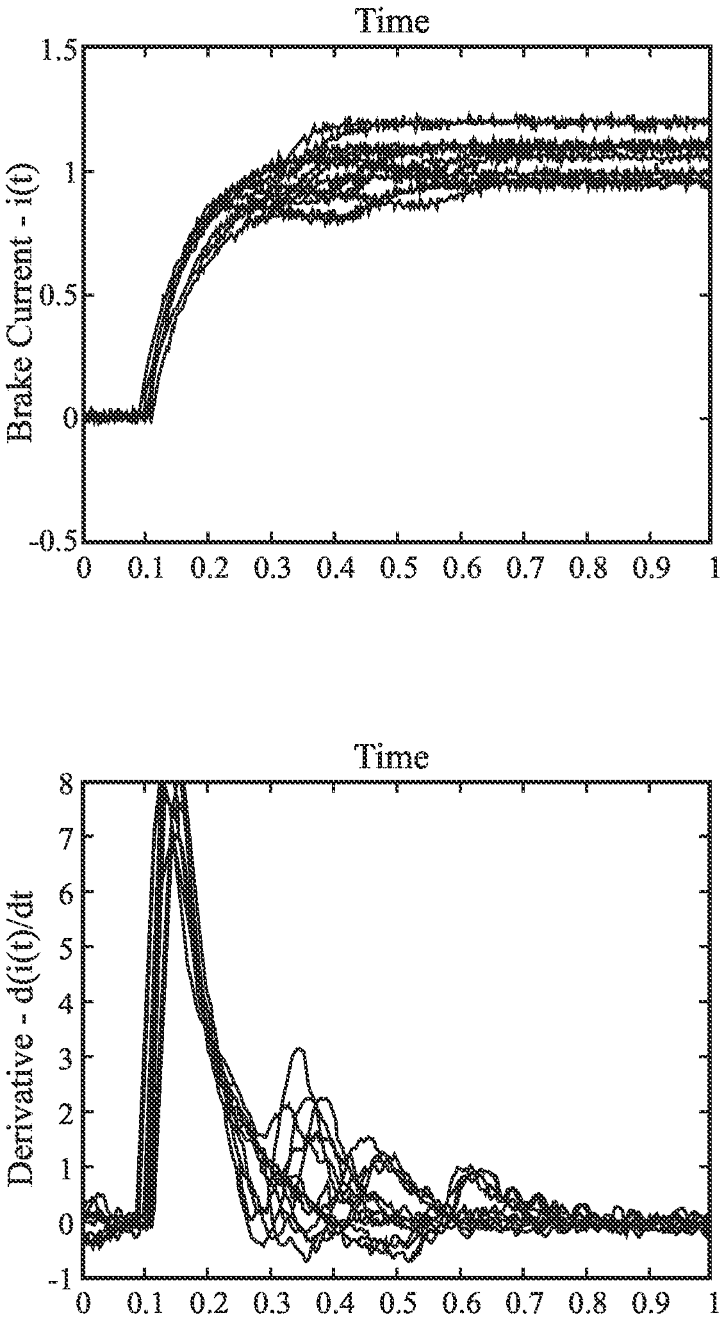
FIG. 18 schematically depicts a graphical representation of an input current indicative of movement of the mobile plates illustrating that current grow may be minimally affected by the mobile plate movement is depicted in the upper graph and the calculated derivative to amplify the original current signal is depicted in the lower graph according to one or more embodiments shown and described herein.

FIG. 18 schematically depicts a graphical representation of several input braking currents indicative of movement of the mobile plates 60 during a lifting brake cycle illustrating that current grow may be minimally affected by the movement of each of the mobile plates 60 is depicted in the upper graph and the calculated derivative to amplify the original current signal for the various input braking currents is depicted in the lower graph.

Figure 19:
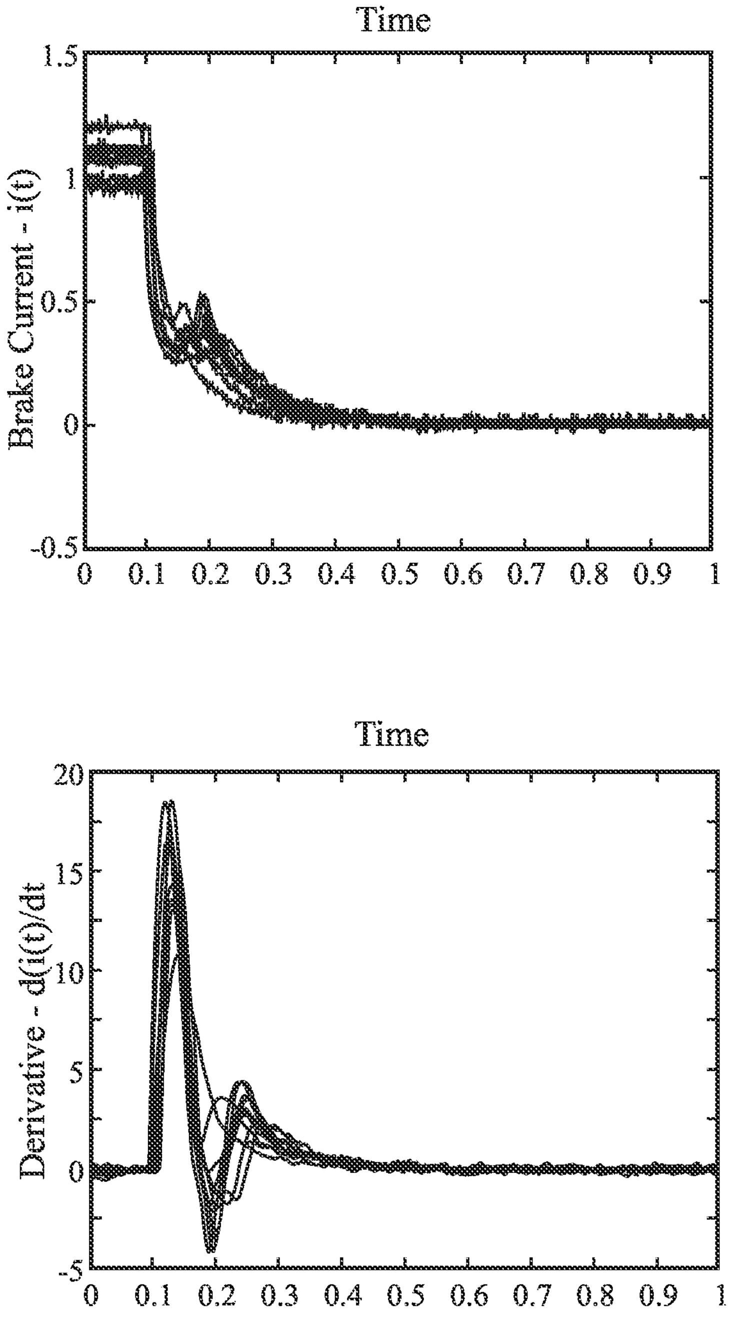
FIG. 19 schematically depicts a graphical representation of an input current indicative of movement of the mobile plates during drop brake is depicted in the upper graph and the calculated derivative is depicted in the lower graph according to one or more embodiments shown and described herein.

FIG. 19 schematically depicts a graphical representation of several input braking currents indicative of movement of the mobile plates 60 during the drop brake cycle is depicted in the upper graph and the calculated derivative to amplify the original signals for the various input braking currents is depicted in the lower graph according to one or more embodiments shown and described herein. As such, it should be understood that the derivative curves for both the lift brake cycle and the drop brake cycle are similar and thus the methods 1000, 1200 may be used for either condition.

FIG. 20 schematically depicts a graphical representation of a quantity of movement of the mobile plates 60 during brake lift is depicted in the upper graph and during the brake drop is depicted in the lower graph. As an example, one way to make the braking current less sensitive is to transform the signal indicative of the braking current into a per unit system (PU) by dividing it to its own rated current before the derivative is calculated. As such, in the derivative curve, the integrated difference between the exponential decay and actual decay is illustrated in FIG. 20 with the hash marks, is proportional to mobile plates 60 amount of movement, since it is affected by the rate of change of inductance with mobile plates 60 position and respective speed.

FIG. 21 schematically depicts a graphical representation of a quantity of movement of the mobile plates 60 during brake lift located between the minimum and the maximum points is depicted in the upper graph and during the brake drop located between minimum and maximum points is depicted in the lower graph. Further the area below the derivative is shaded. As such, both the minimum point and the maximum point belong to the derivative curve.

Figure 22:
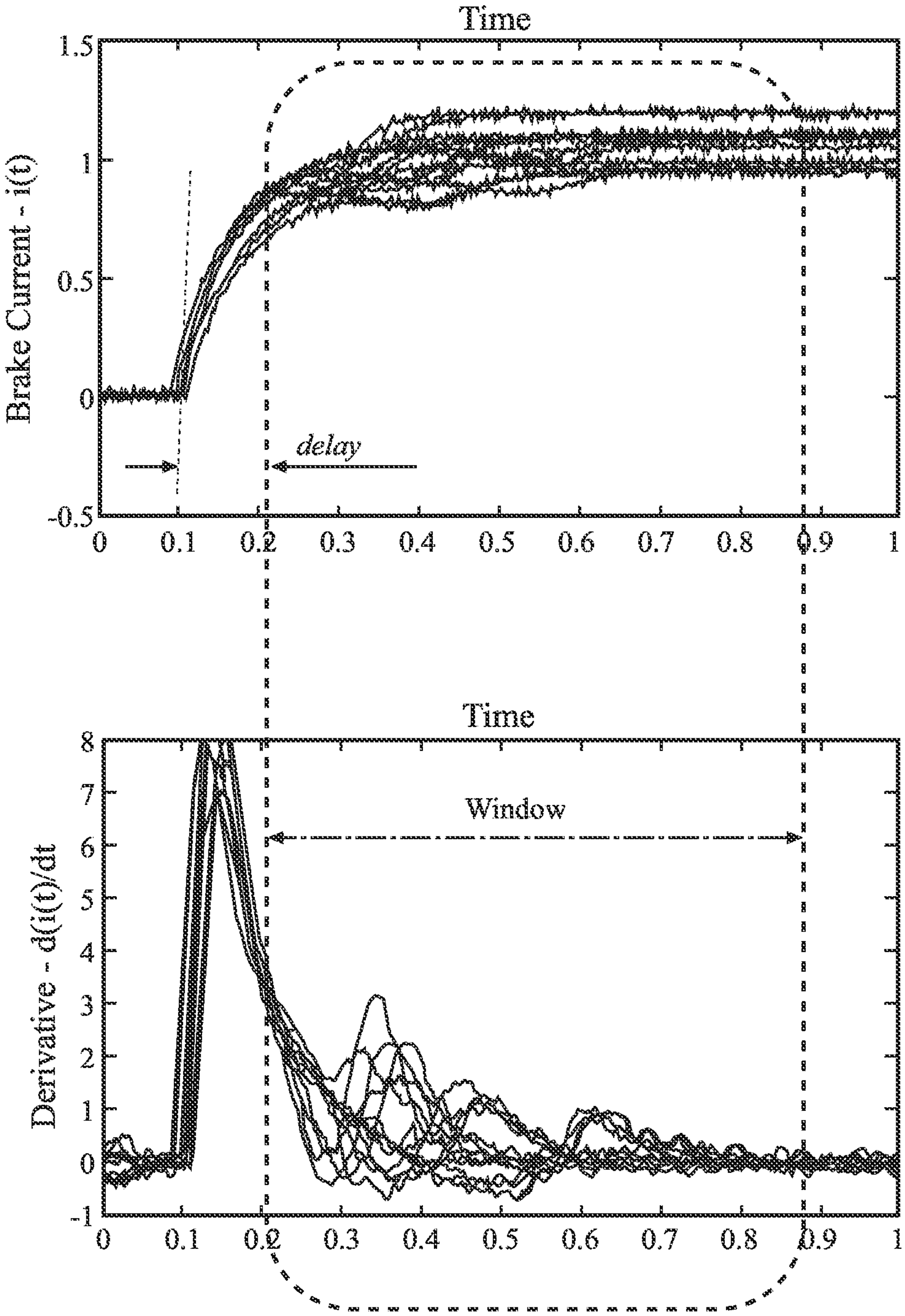
FIG. 22 schematically depicts a graphical representation of an input current indicative of movement of the mobile plates illustrating that current grow may be minimally affected by the movement of the mobile plates is depicted in the upper graph and the calculated derivative to amplify the original current signal in the lower graph and a window for determining the minimum and maximum points is depicted in the lower graph according to one or more embodiments shown and described herein.

FIG. 22 schematically depicts a graphical representation of an input braking current indicative of movement of the mobile plates 60 during a lifting cycle is depicted in the upper graph and the calculated derivative to amplify the original current signal in the lower graph. Further rather than using a region of interest, a window may be utilized that the time duration within the window is when the minimum and maximum points are expected to happen or occur under all circumstances (e.g., including delays from energizing and turning off for lift and drop cycles, and the like). As such, FIG. 22 illustrates embodiments that use a window to delay in determining the minimum and maximum points.

That is, the window defines where methods 1000, 1200 are executed to run associated with the expected movement of the mobile plates 60 elevator such that the methods 1000, 1200 do not run continuously and instead avoids the initial portion of the derivative curve. Similar to discussed above, if the minimum and the maximum points are not detected, as is the case when one of the mobile plates 60 do not move, the area/integrator will stay at zero. In these embodiments, the areas within the window are compared with the certain predetermined thresholds discussed herein to determine whether each of the mobile plates 60 have moved as expected. The threshold values are set based on whether in the lift cycle or the drop cycle and the normal operating results for these cycles under all circumstances. Threshold values may change or be altered around the defined point if temperature or voltage compensation is applied, with brake size, and the like.

Figure 23:
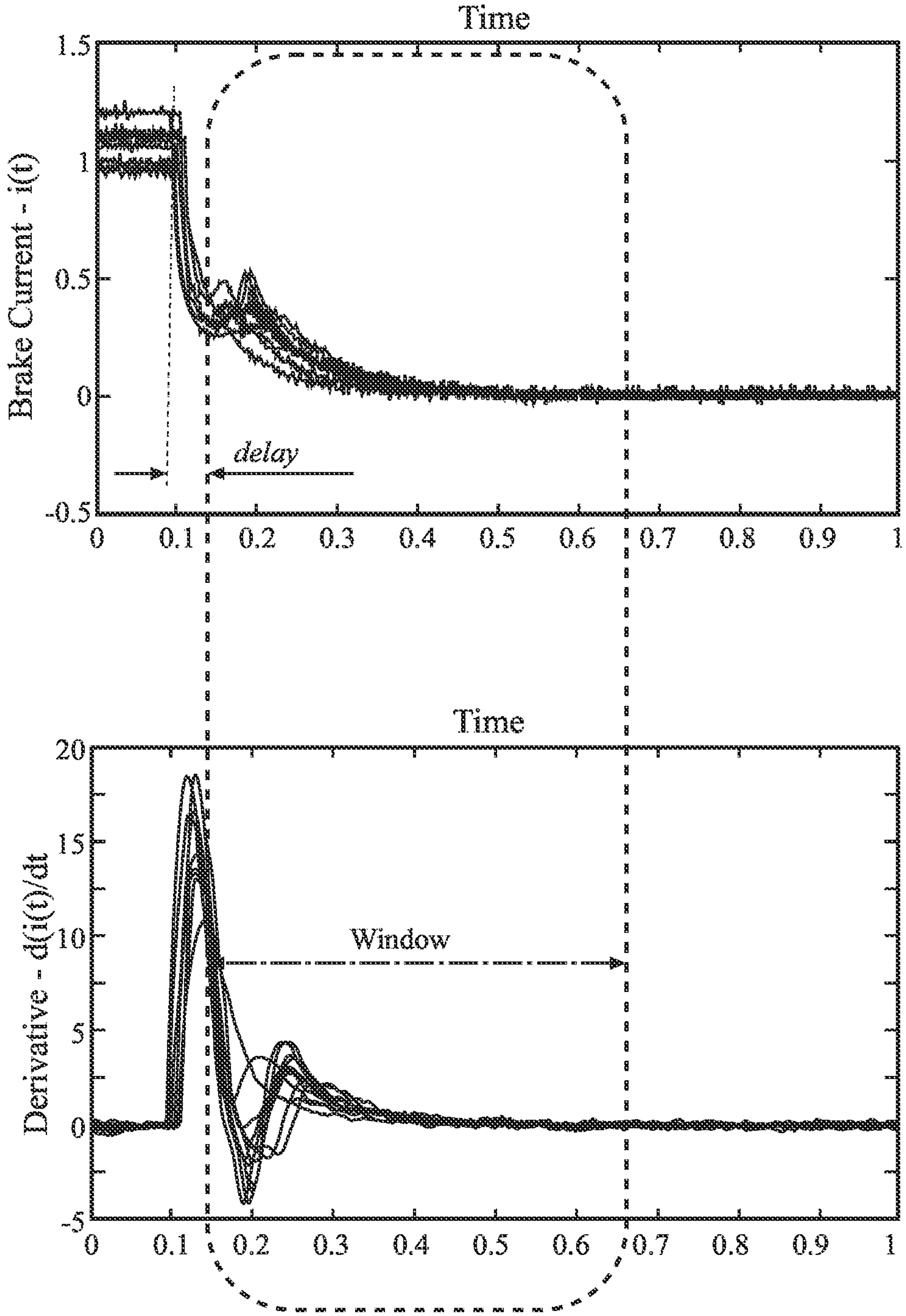
FIG. 23 schematically depicts a graphical representation of an input current indicative of movement of the mobile plates during a drop brake is depicted in the upper graph and the calculated derivative in the lower graph and a window for determining the minimum and maximum points is depicted in the lower graph according to one or more embodiments shown and described herein.

FIG. 23 schematically depicts a graphical representation of an input braking current indicative of movement of the mobile plates 60 during a drop brake cycle is depicted in the upper graph and the calculated derivative in the lower graph. Further, similar to FIG. 22, the window is utilized in this embodiment.

It should now be understood that the embodiments described herein are directed to improved systems and methods to monitor and identify when an elevator braking assembly may not be functioning properly. Such monitoring is remotely achievable and alerts are provided to the elevator controllers to inhibit movement of the traction sheave affected.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for monitoring operating conditions of an elevator braking assembly communicatively coupled to a traction sheave that moves an elevator cab between a plurality of positions, the elevator braking system having at least one mobile plate and a coil that when energized moves the at least one mobile plate from an engaged position to inhibit movement of the traction sheave to a disengaged position, the system comprising:

- an elevator controller configured to control movement of the elevator cab;
- a processing device communicatively coupled to the elevator controller; and
- a non-transitory, processor-readable storage medium in communication with the processing device, the non-transitory, processor-readable storage medium comprising one or more programming instructions that, when executed, cause the processing device to:
  - receive an actual braking current data from the elevator braking assembly;
  - determine a derivative of the actual braking current data;
  - plot a derivative curve of the derivative of the actual braking current data;
  - determine a region of interest of the derivative curve that corresponds to an expected movement of the at least one mobile plate of the elevator braking assembly;
  - determine whether a pair of inflection points occurred during the region of interest where one of the inflection points is a minimum point and the other is a maximum point, the maximum point having a greater value than the minimum point and occurring after the occurrence of the minimum point; and
  - when the pair of inflection points does not occur during the region of interest of the derivative curve, output an alert to the elevator controller to instruct the elevator controller to inhibit movement of the elevator cab.

2. The system of claim 1, wherein the determination of the derivative of the actual braking current data is by a second order transfer function.

3. The system of claim 1, wherein the non-transitory, processor-readable storage medium further comprising the one or more programming instructions that, when executed, cause the processing device to:

- determine an absolute difference value between the minimum point and the maximum point.

4. The system of claim 3, wherein when the absolute difference value between the minimum point and the maximum point is less than a predetermined threshold value, output the alert to the elevator controller to instruct the elevator controller to inhibit movement of the elevator cab.

5. The system of claim 1, wherein the non-transitory, processor-readable storage medium further comprising the one or more programming instructions that, when executed, cause the processing device to:

- determine a time duration extending between the minimum point and the maximum point.

6. The system of claim 5, wherein when the time duration extending between the minimum point and the maximum point is less than a predetermined time threshold value, output the alert to the elevator controller to instruct the elevator controller to inhibit movement of the elevator cab.

7. A system for monitoring operating conditions of an elevator braking assembly of an elevator assembly, the elevator assembly further including an elevator controller, an elevator cab and at least one traction sheave having the braking assembly coupled thereto, the elevator braking system having at least one mobile plate and a coil that when energized moves the at least one mobile plate from an engaged position to inhibit movement of the at least one traction sheave to a disengaged position, an elevator hoisting member extending around the at least one traction sheave to support the elevator cab, and the elevator controller configured to control the at least one traction sheave to move the elevator hoisting member to move the elevator cab, the system comprising:

- a processing device communicatively coupled to the elevator controller; and
- a non-transitory, processor-readable storage medium in communication with the processing device and having one or more programming instructions that, when executed, cause the processing device to:
  - receive an actual braking current data from the elevator braking assembly that is filtered and converted to digital signals;
  - determine a derivative of the digital signals;
  - plot a derivative curve of the determined derivative of the digital signals indicative of the actual braking current data;
  - determine a region of interest of the derivative curve that corresponds to an expected movement of at least one mobile plate of the elevator braking assembly;
  - determine whether a pair of inflection points occurred during the region of interest where one of the inflection points is a minimum point and the other is a maximum point, the maximum point having a greater value than the minimum point and occurring after the occurrence of the minimum point; and
  - when the pair of inflection points does not occur during the region of interest of the derivative curve, output an alert to the elevator controller to instruct the elevator controller to inhibit movement of the elevator cab.

8. The system of claim 7, wherein the determination of the derivative of the digital signals is by a second order transfer function.

9. The system of claim 7, wherein the non-transitory, processor-readable storage medium further comprising the one or more programming instructions that, when executed, cause the processing device to:

- determine an absolute difference value between the minimum point and the maximum point.

10. The system of claim 9, wherein when the absolute difference value between the minimum point and the maximum point is less than a predetermined threshold value, output the alert to the elevator controller to instruct the elevator controller to inhibit movement of the elevator cab.

11. The system of claim 9, wherein the non-transitory, processor-readable storage medium further comprising the one or more programming instructions that, when executed, cause the processing device to:

- calculate an area under the derivative curve between the minimum point and the maximum point.

12. The system of claim 11, wherein the non-transitory, processor-readable storage medium further comprising the one or more programming instructions that, when executed, cause the processing device to:

- determine whether the area under the derivative curve is less than an area predetermined threshold.

13. The system of claim 12, wherein the non-transitory, processor-readable storage medium further comprising the one or more programming instructions that, when executed, cause the processing device to:

- when the area under the derivative curve is less than the area predetermined threshold, determine whether the region of interest has ended; and
- output the alert to the elevator controller to instruct the elevator controller to inhibit movement of the elevator cab when the region of interest has ended.

14. The system of claim 7, wherein the non-transitory, processor-readable storage medium further comprising the one or more programming instructions that, when executed, cause the processing device to:

- determine a time duration extending between the minimum point and the maximum point.

15. The system of claim 14, wherein when the time duration extending between the minimum point and the maximum point is less than a predetermined time threshold value, output the alert to the elevator controller to instruct the elevator controller to inhibit movement of the elevator cab.

16. A method for monitoring operating conditions of an elevator braking assembly of an elevator assembly, the elevator assembly further including an elevator controller, an elevator cab and at least one traction sheave having the braking assembly coupled thereto, the elevator braking system having at least one mobile plate and a coil that when energized moves the at least one mobile plate from an engaged position to inhibit movement of the at least one traction sheave to a disengaged position, an elevator hoisting member extending around the at least one traction sheave to support the elevator cab, and the elevator controller configured to control the at least one traction sheave to move the elevator hoisting member to move the elevator cab, the method comprising:

- receiving an actual braking current data from the elevator braking assembly;
- determining a derivative of the actual braking current data;
- plotting a derivative curve of the derivative of the actual braking current data;
- determine a region of interest of the derivative curve that corresponds to an expected movement of the at least one mobile plate of the elevator braking assembly;
- determining whether a pair of inflection points occurred during the region of interest where one of the inflection points is a minimum point and the other is a maximum point, the maximum point having a greater value than the minimum point and occurring after the occurrence of the minimum point; and
- when the pair of inflection points does not occur during the region of interest of the derivative curve, outputting an alert to the elevator controller to instruct the elevator controller to inhibit movement of the elevator cab.

17. The method of claim 16, wherein the determination of the derivative of the actual braking current data is by a second order transfer function.

18. The method of claim 16, further comprising the steps of:

determining an absolute difference value between the minimum point and the maximum point; and when the absolute difference value between the minimum point and the maximum point is less than a predetermined threshold value, outputting the alert to the elevator controller to instruct the elevator controller to inhibit movement of the elevator cab.

19. The method of claim 16 further comprising the steps of:

determining a time duration extending between the minimum point and the maximum point; and when the time duration extending between the minimum point and the maximum point is less than a predetermined time threshold value, outputting the alert to the elevator controller to instruct the elevator controller to inhibit movement of the elevator cab.

20. The method of claim 16 further comprising the steps of:

calculating an area under the derivative curve between the minimum point and the maximum point;

determining whether the area under the derivative curve is less than an area predetermined threshold;

when the area under the derivative curve is less than the area predetermined threshold, determining whether the region of interest has ended; and outputting the alert to the elevator controller to instruct the elevator controller to inhibit movement of the elevator cab when the region of interest has ended.

* * * * *